United States Patent
Wood et al.

[11] Patent Number: 5,654,889
[45] Date of Patent: Aug. 5, 1997

[54] SIMPLIFIED PATTERN RECOGNITION WHEEL SLIDE PROTECTION

[75] Inventors: James A. Wood, Spartanburg; David A. Greer, Simpsonville, both of S.C.

[73] Assignee: Westinghouse Air Brake Company, Wilmerding, Pa.

[21] Appl. No.: 460,200

[22] Filed: Jun. 2, 1995

[51] Int. Cl.$^6$ .................................................. B60T 8/32
[52] U.S. Cl. ................... 364/426.015; 246/168.1; 303/128
[58] Field of Search .................. 364/426.01, 426.015, 364/426.027; 180/197; 246/168.1; 303/95, 100, 103, 128

[56] References Cited

U.S. PATENT DOCUMENTS

| | | | |
|---|---|---|---|
| 3,482,887 | 12/1969 | Sheppard . | |
| 4,071,282 | 1/1978 | Callahan et al. | 303/106 |
| 4,298,940 | 11/1981 | Tadokoro et al. | 364/426.03 |
| 4,347,569 | 8/1982 | Allen, Jr. et al. | 364/426.03 |
| 4,410,947 | 10/1983 | Strong et al. | 180/197 |
| 4,486,839 | 12/1984 | Mazur et al. | 303/95 |
| 4,491,920 | 1/1985 | Wood et al. | 303/103 |
| 4,941,099 | 7/1990 | Wood et al. | 364/426.02 |
| 4,987,543 | 1/1991 | Wood et al. | 364/426.03 |
| 4,999,779 | 3/1991 | Wood et al. | 364/426.03 |
| 5,179,526 | 1/1993 | Zimmer et al. | 364/426.02 |
| 5,210,692 | 5/1993 | Fennel et al. | 364/426.02 |
| 5,244,171 | 9/1993 | Drake et al. | 364/426.02 |
| 5,280,718 | 1/1994 | Drake et al. | 73/129 |
| 5,290,095 | 3/1994 | Wood et al. | 364/426.05 |
| 5,292,184 | 3/1994 | Takata | 364/426.02 |
| 5,299,131 | 3/1994 | Haas et al. | 364/426.03 |
| 5,436,836 | 7/1995 | Holtz et al. | 364/426.03 |
| 5,453,942 | 9/1995 | Wood et al. | 364/426.03 |
| 5,471,387 | 11/1995 | Wood et al. | 364/426.03 |

*Primary Examiner*—Gary Chin
*Attorney, Agent, or Firm*—James Ray & Associates

[57] ABSTRACT

This invention provides method and apparatus for an improved pattern recognition wheel slide protection system for passenger transit type railway vehicles. It receives as inputs the rotational velocities of all the axles on the vehicle, and the acceleration rates for the axles. It also receives signals for brake cylinder pressure. The system uses the velocity and acceleration data to determine whether the wheels on an axle are slipping, and determines the severity of the slip. It calculates a timeout value based on the severity of the slip, and times a slip correction until the timeout value is reached, whereupon the slip correction is terminated. The system uses a simplified logic for providing brake control signals. A cascade logic method is used in which the brake control signal starts out indicating full application, then, based on signals indicating change in sign of acceleration rate, and acceleration rate in excess of a predetermined value, changes the brake control signal to pulsed brake application. Further indications based on axle velocity and acceleration cause the signal to change to a hold signal, then to a release pulse signal, and finally to a signal for release. This cascaded logic provides signals for brake valve control which have five values, APPLY, APPLY PULSE, HOLD, RELEASE PULSE, and RELEASE. Information obtained from axle rate signals is also used to specify for the RELEASE PULSE mode the duration of release and the duration of hold.

16 Claims, 12 Drawing Sheets

SIMPLIFIED PATTERN RECOGNITION WHEEL SLIDE PROTECTION

CROSS REFERENCE TO RELATED APPLICATIONS

The invention taught in this patent application is closely related to additional inventions which are taught in the following patent and patent application:

"A METHOD OF AND APPARATUS FOR THE COMBINED DETECTION OF SPEED VARYING ENERGY LEVEL WHEEL SLIP DETECTION AND DETERMINATION OF WHEEL SLIP INTENSITY OF A RAILWAY VEHICLE BRAKE SYSTEM". This patent was filed on Apr. 18, 1994, and is now U.S. Pat. No. 5,471,387. This patent is assigned to the assignee of the present invention.

PROPORTIONAL POLARITY SHIFT WHEEL SLIDE PROTECTION. This application was filed on May 8, 1995 and bears Ser. No. 08/436,882. This application is also assigned to the assignee of the present invention.

FIELD OF THE INVENTION

The present invention relates, in general, to railway braking systems and, more particularly, this invention relates to a braking system utilized on a passenger transit, or similar type railway vehicle and has as its principle purpose the modulation of brake application forces being applied to such railway vehicle to prevent both wheel slide and wheel lockup. To clarify terminology used in this patent, it is noted that the term "rate" generally means acceleration. The phrase "acceleration rate" means acceleration. The phrase "axle rate" means rotary acceleration of an axle. It is expressed as the time derivative of the axle speed, the axle speed being the linear speed of the tread of the wheel relative to the axle. The phrase "rate polarity" has the following meaning. The rate polarity is taken to be positive if the axle rate is greater than a small predetermined quantity. The rate polarity is taken to be negative if the axle rate is negative, zero, or less than the small predetermined quantity. The term "rate polarity shift" is an event in which an axle rate polarity goes from positive to negative. The term "energy", as used in this application, does not have the same meaning as is understood in arts and disciplines other than railway braking systems. In the railway braking art, the term "energy" is used as an indication of axle speed.

BACKGROUND OF THE INVENTION

A variety of approaches have been developed by railway vehicle brake system manufacturers, prior to the present invention, for railroad type braking systems in an attempt to control wheel slide as well as wheel lockup during a braking application. Most all of the present day adhesion adaptive, pattern recognition, wheel slide control processes use extremely complex digital logic arrangements in order to achieve the desired result.

These complex logic arrangements will quite often contain a number of variables and tables of variables. These variables and tables of variables are generally "setup" or "tuned" to each individual application. Actual field experience has demonstrated that this "tuning" process requires an individual who must be highly skilled in the art of railway wheel slide control design and application. In addition, this individual must possess a talent in the area of abstract reasoning. As would generally be expected, there are not a large number of individuals in this field who will possess all of these necessary qualifications.

Further difficulties experienced with these prior braking systems, which are presently known to applicants, include the possibility of their generating false signals indicating wheel slip.

One prior art type brake system which uses data from all of the axles disposed on the railway vehicle to determine wheel slide is taught in U.S. Pat. No. 4,071,282, issued Jan. 31, 1978 and entitled SLIP-SLIDE DETECTOR SYSTEM FOR RAILWAY CAR WHEELS. Although this brake system uses data from all the axles, it does not possess the capability of compensating for different wheel diameters. Such different wheel diameters may be caused, for example, by wear of the wheels. Thus, if the axles have different speeds, it may appear that a wheel slip is occurring, whereas in reality, the difference in axle speed may be due to differences in wheel diameter.

Additional background information regarding prior art wheel slippage control logic based on axle speed and acceleration rate is provided in U.S. Pat. No. 4,941,099, entitled "Adhesion Adaptive Wheel Slide Protection Process", which is, also, assigned to the assignee of the present invention.

Another method of detecting wheel slip and determining the severity of such wheel slip is described in the co-pending application, which was mentioned above: A METHOD OF AND APPARATUS FOR THE COMBINED DETECTION OF SPEED VARYING ENERGY LEVEL WHEEL SLIP DETECTION AND DETERMINATION OF WHEEL SLIP INTENSITY OF A RAILWAY VEHICLE BRAKE SYSTEM. This application bears Ser. No. 08/228,660 and was filed on Apr. 18, 1994, and is assigned to the assignee of the present invention. This invention forms a part of the present invention.

Another prior art method used for determining that a wheel slide has been corrected has been taught in U.S. Pat. No. 4,491,920, which is entitled "RATE POLARITY SHIFT WHEEL-SLIP CONTROL SYSTEM". This patent was issued on Jan. 1, 1985, and is, likewise, assigned to the assignee of the present invention.

This particular invention determines that a wheel slide condition has been corrected when the acceleration rate of an axle, which is sliding and being corrected, makes a transition from a positive to a negative acceleration rate.

The situation which is detected here is that of a wheel which has been sliding, and for which the braking force has been reduced. Reduction of the braking force allows the axle to accelerate and thereby approach the speed of the train, so its acceleration rate is positive. When such axle reaches the speed of the train, then its acceleration will become negative because the train, due to the braking, has a negative acceleration. At that point in time, since the wheel sliding has been corrected, the braking force on the axle is reapplied. This invention also forms a part of the present invention.

The teachings of each of U.S. Pat. Nos. 4,491,920, and 4,941,099 are incorporated herein by reference thereto.

The teachings of the patent application: A METHOD OF AND APPARATUS FOR THE COMBINED DETECTION OF SPEED VARYING ENERGY LEVEL WHEEL SLIP DETECTION AND DETERMINATION OF WHEEL SLIP INTENSITY OF A RAILWAY VEHICLE BRAKE SYSTEM, which is Ser. No. 08/228,660, filed on Apr. 18, 1994, and assigned to the assignee of the present invention, are also incorporated herein by reference thereto.

The teachings of the patent application: PROPORTIONAL POLARITY SHIFT WHEEL SLIDE PROTECTION, filed on May 8, 1995 and assigned Ser. No.

08/436,882, and assigned to the assignee of the present invention, are also incorporated herein by reference thereto.

SUMMARY OF INVENTION

In a first aspect, the present invention provides an apparatus for wheel slip control on a passenger transit type railway vehicle. The apparatus is connected in a manner to at least receive signals representing the speeds and acceleration rates of each of the axles disposed on such vehicle. The apparatus will generate signals which indicate, for each of the axles, whether or not the wheels are slipping. The apparatus also generates signals which will indicate the energy loss of the axles due to wheel slip.

The apparatus utilizes such signals indicating the energy loss due to wheel slip to calculate a wheel slip enable timeout value for each such axle. This timeout value establishes a time for wheel slip correction, and has a value which is longer the greater the energy loss of the axle.

When a wheel slip is detected, the apparatus starts a timer for the wheel slip correction. When the time reaches the timeout value, the timer communicates a signal for ending such wheel slip correction.

In another aspect, the present invention provides an apparatus for an additional improvement in such wheel slip correction of a passenger transit type railway vehicle. The apparatus is connected to at least receive signals representing a speed and an acceleration rate for all of the axles on the railway vehicle. Such apparatus further provides means whereby signals are generated representing normalized axle speeds which compensate for different wheel diameters. The apparatus, also, includes a means for generating a signal for wheel slip enablement based on the signals representing normalized axle speeds and axle acceleration rates. This signal is then processed through a cascaded logic which uses inputs based on normalized axle speeds, acceleration rates, and acceleration rate polarity shift to generate a signal for the modulation of brake application forces.

In a further aspect, the present invention provides a method for wheel slip control on a passenger transit type railway vehicle, which utilizes the signals representing the speeds and acceleration rates of the axles of the vehicle. The method involves generating signals which indicate, for each of the axles, whether or not the wheels are slipping. The method also involves generating signals indicating the energy loss of the axles due to such wheel slip.

The method uses such signals indicating the energy loss due to wheel slip to calculate a wheel slip enable timeout value for each such axle. This timeout value establishes a time for wheel slip correction, and has a value which is longer the greater the energy loss of the axle.

When wheel slip is detected, a timer is started for the wheel slip correction. When the time reaches the timeout value, the timer communicates a signal for ending wheel slip correction.

In another aspect, the present invention provides a method for implementing another approach to desirable wheel slip correction of a passenger transit type railway vehicle. According to this method, signals are received representing speeds and acceleration rates for all of the axles on the railway vehicle. Signals are then generated representing normalized axle speeds which compensate for different wheel diameters. The method, also, provides for generating a signal for wheel slip enablement based on the signals representing normalized axle speeds and axle acceleration rates. This signal is then processed through a cascaded logic which uses inputs based on normalized axle speeds, acceleration rates, and acceleration rate polarity shift to generate another signal for modulation of brake application forces.

OBJECTS OF THE INVENTION

It is, therefore, one of the principal objects of the present invention to provide an improved wheel slip control arrangement for modulating the brakes disposed on a passenger transit type motor vehicle.

Another object of the present invention is to provide a wheel slip control arrangement which is less prone to spurious signals indicating wheel slip, when compared to some prior art type wheel slip control systems.

Still another object of the present invention is to provide a wheel slip control system which has simplified logic, with fewer parameters requiring adjustment, than such prior art type wheel slip control systems thereby enhancing the reliability of such wheel slip control system.

Yet another object of the present invention is to provide a wheel slip control arrangement which employs relative axle speeds as one indication of a wheel slip, and to compensate for relative wheel diameter so that relative normalized axle speeds are used; the normalization factors depending upon the relative wheel diameters.

A further object of the present invention is to provide a wheel slip control system which reduces the number of spurious signals indicating wheel slip by employing a timer which has a timeout value dependent on the energy loss of an axle due to wheel slip; wherein such timer is used to time the wheel slip correction, so that when the timeout value is reached a wheel slip correction is disabled and remains disabled until signals indicating wheel slip are again received.

It is a further object of the present invention to provide a wheel slip control system wherein a signal to the brake valves based on normalized axle velocities, axle accelerations, and a signal indicating a change in axle acceleration from positive to negative is utilized in the logic for generating the brake valve signal starts with a brake valve signal indicating full application of the brakes.

An additional object of the present invention is to provide a wheel slip control system in which the various indications of wheel slip indicated by normalized axle velocities, axle accelerations, and a signal indicating a change in axle acceleration from positive to negative are used in a cascade of tests, passing from application through lap to release.

Still yet another object of the present invention to provide a wheel slip control arrangement in which the system may provide five levels of brake valve control: application, pulsed application, hold present application, pulsed release and full release.

In addition to the various objects and advantages of the present invention described above, various additional objects and advantages of the invention will become more readily apparent to one skilled in the art from the following more detailed description of the invention, particularly, when such description is taken in conjunction with the attached drawing figures and with the appended claims.

BRIEF DESCRIPTION OF INVENTION AND PRESENTLY-PREFERRED EMBODIMENT

FIGS. 1 through 6 are block diagrams which define the presently preferred control functions of the invention. These control functions may be accomplished by separate modules connected as shown, or they may be incorporated into a microprocessor. In the latter case, the functions of the blocks in these figures are accomplished by lines of code, and the conveyance of information from one block to another is accomplished by one block writing data to the microprocessor's memory, and another block accessing that data from such memory.

Figure 1A:
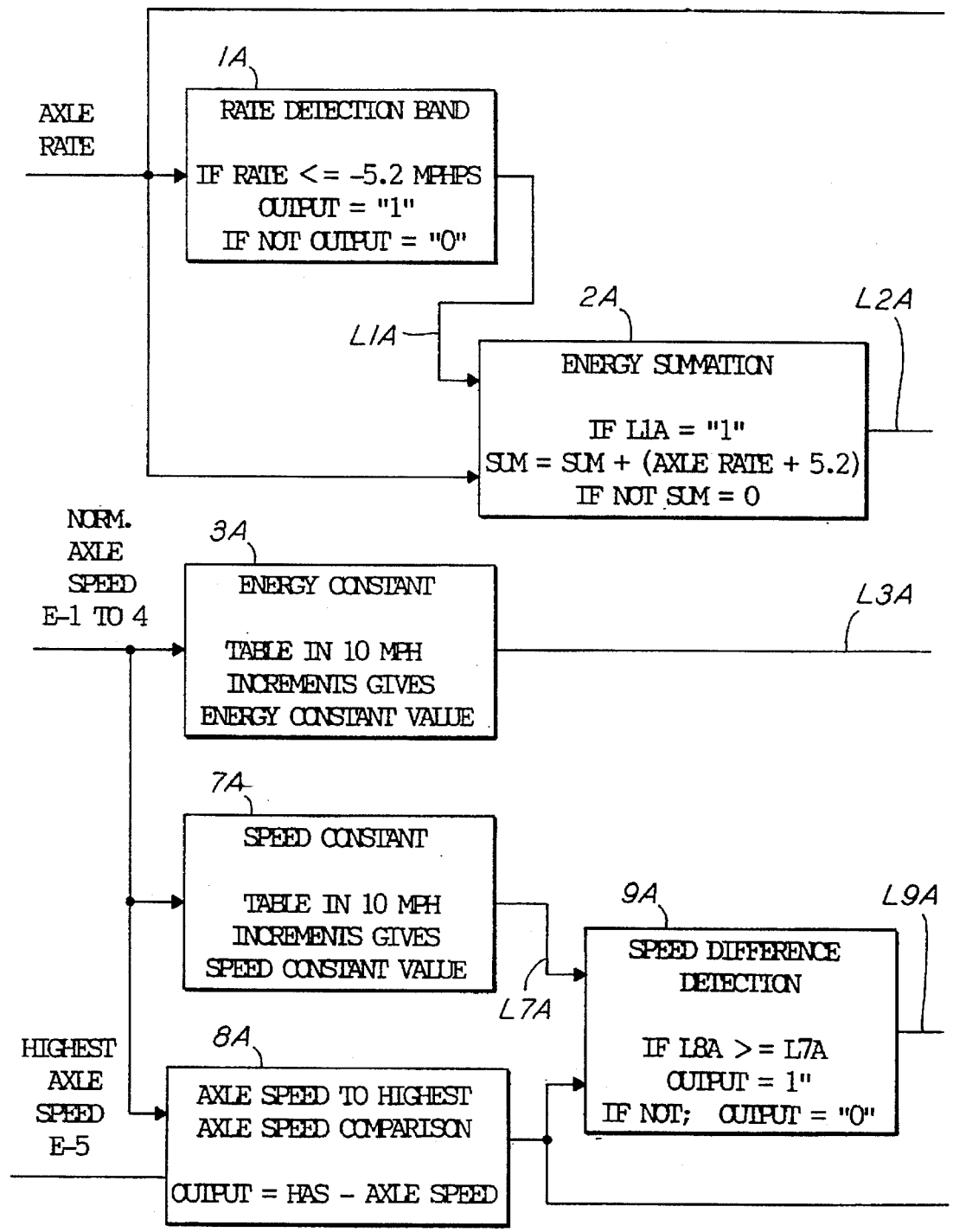
FIGS. 1A–1B are a block diagram of Module A, which is used to detect wheel slip on a per axle basis, and to provide some related signals.
Figure 1B:
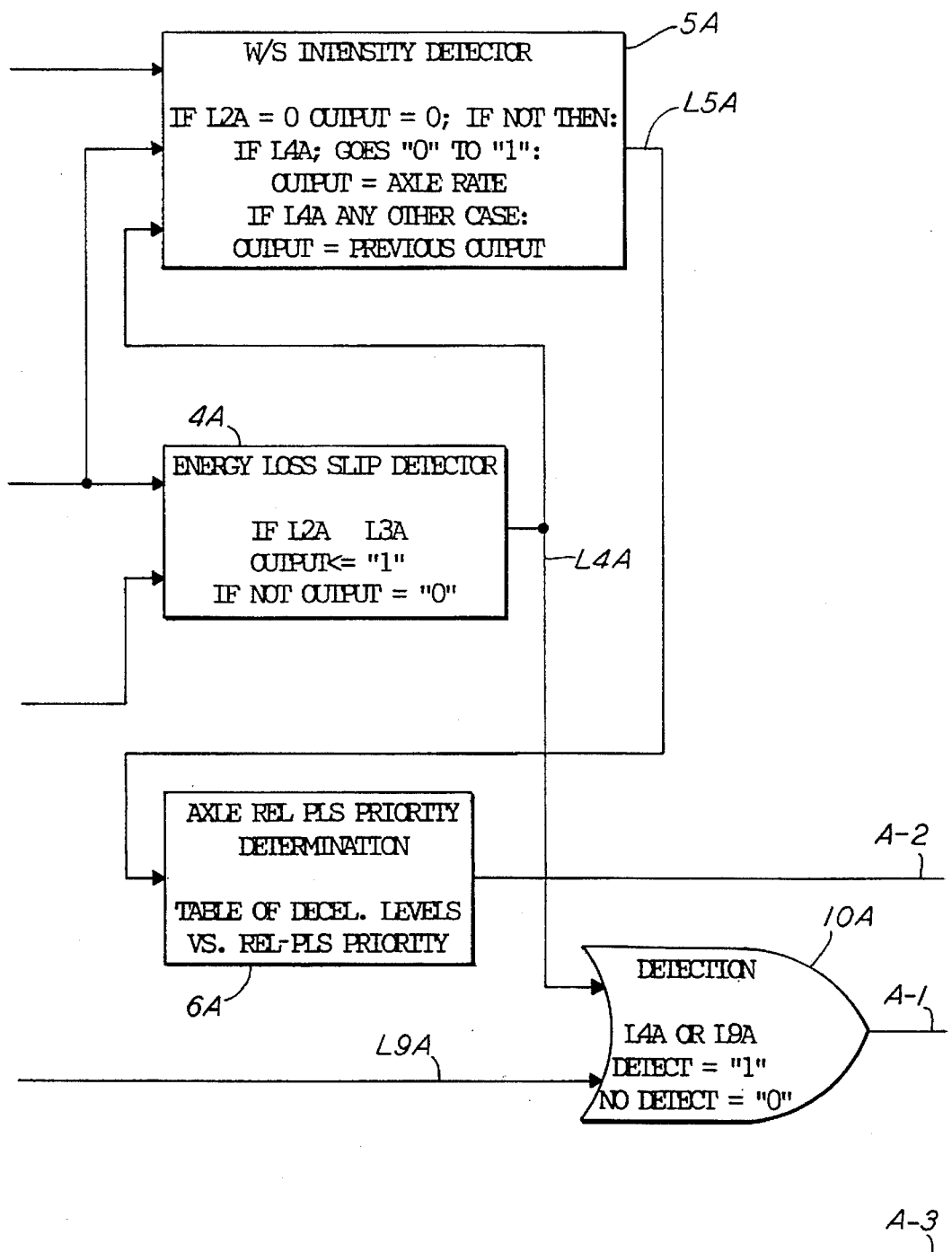
Figure 2A:
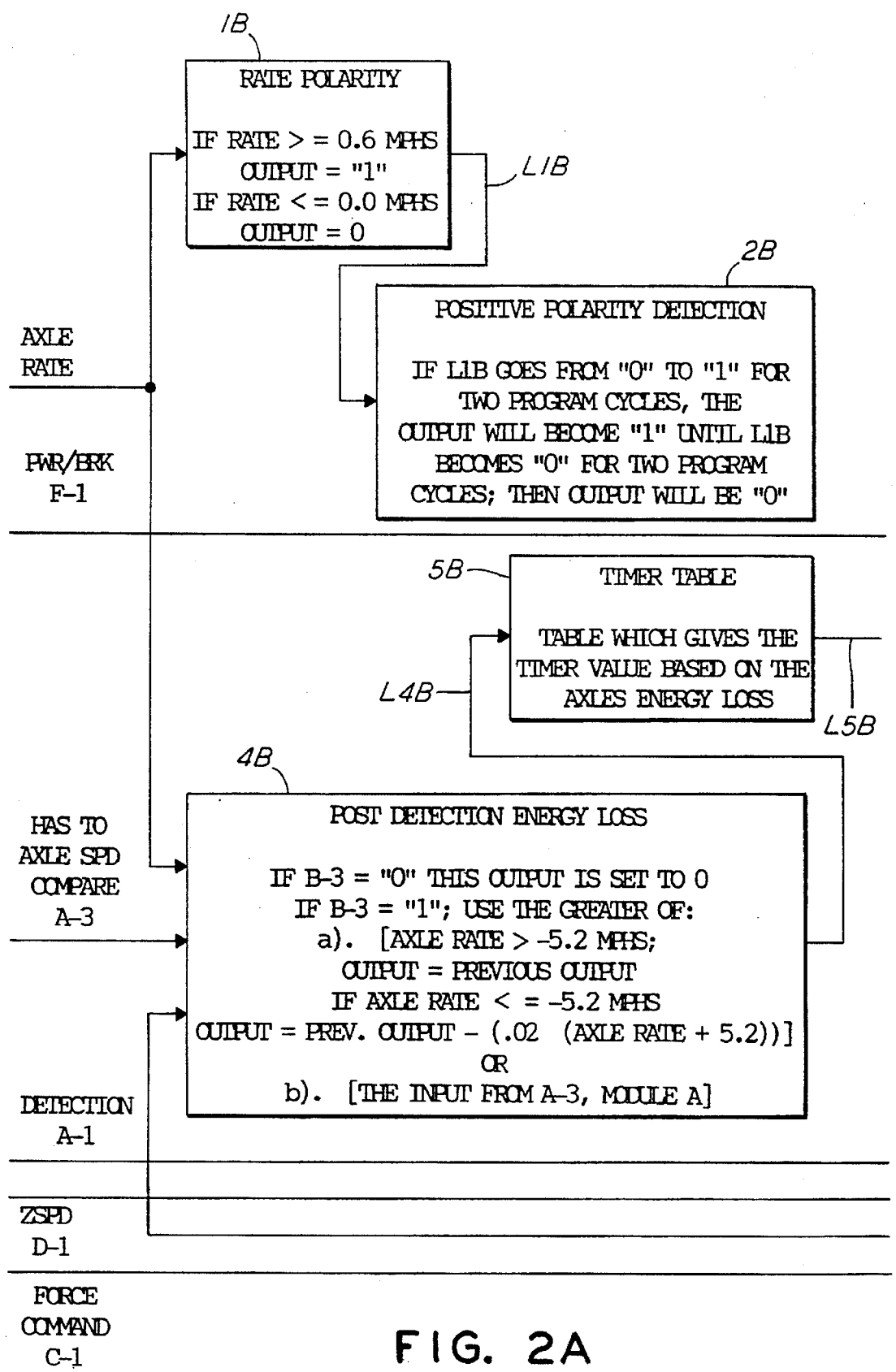
FIGS. 2A–2B are a block diagram of Module B, which provides for polarity shift detection, energy loss, and the timer function on a per axle basis.
Figure 2B:
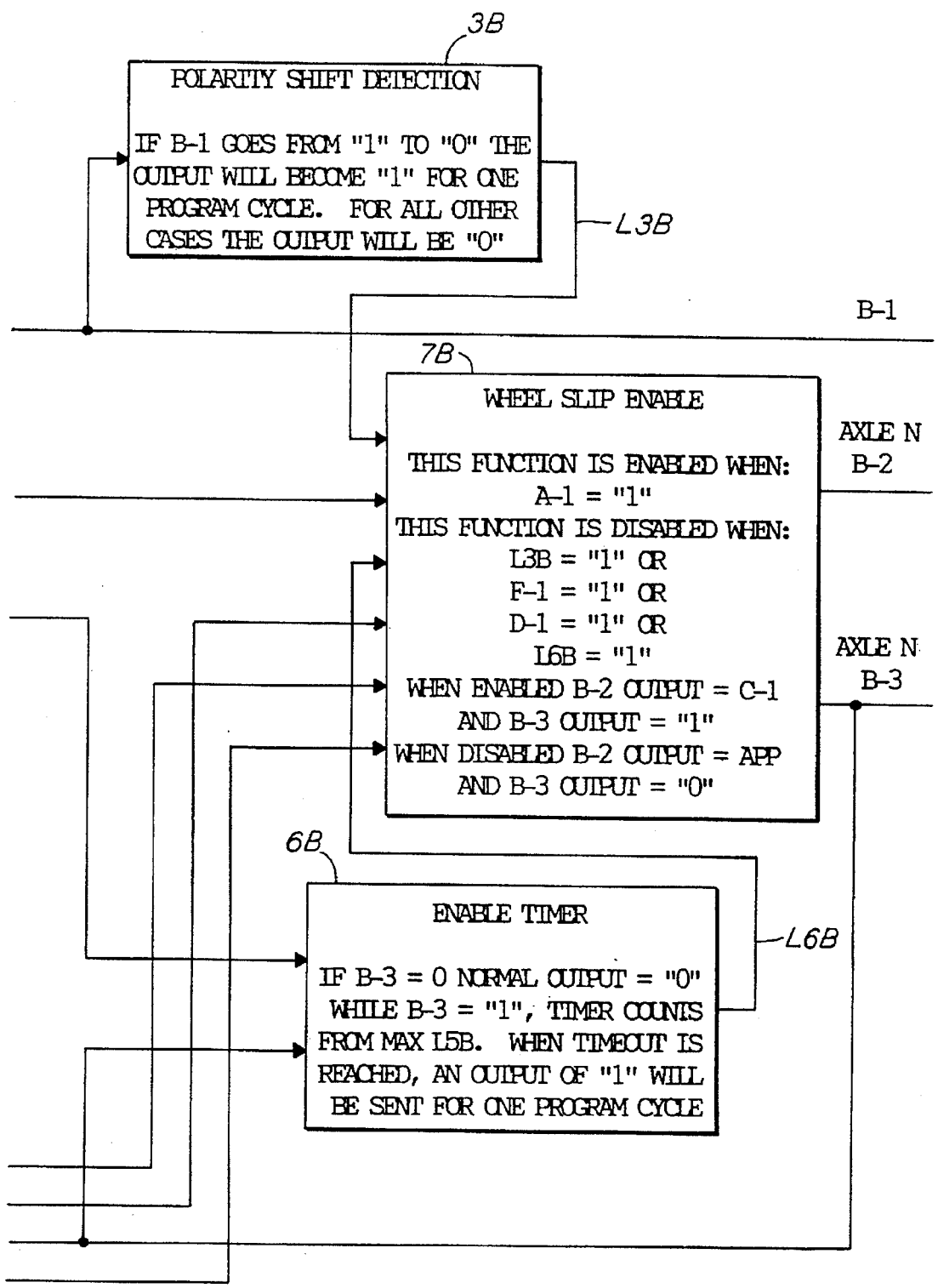
Figure 3A:
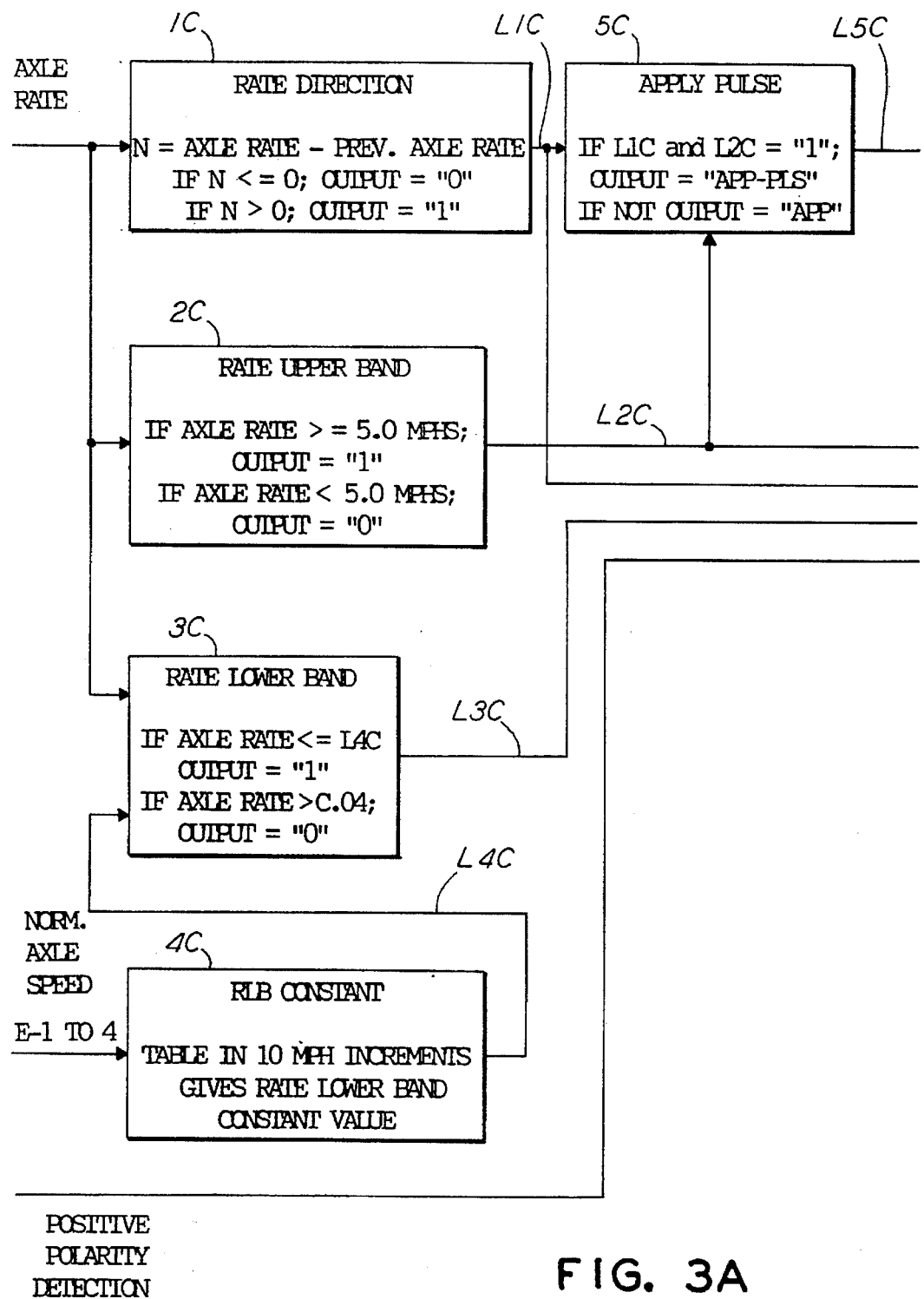
FIGS. 3A–3B are a block diagram of Module C, which is performed on a per axle basis to generate a brake release signal which is processed through a cascade of tests based on normalized axle speeds, axle accelerations, and a signal indicating acceleration rate polarity shift.
Figure 3B:
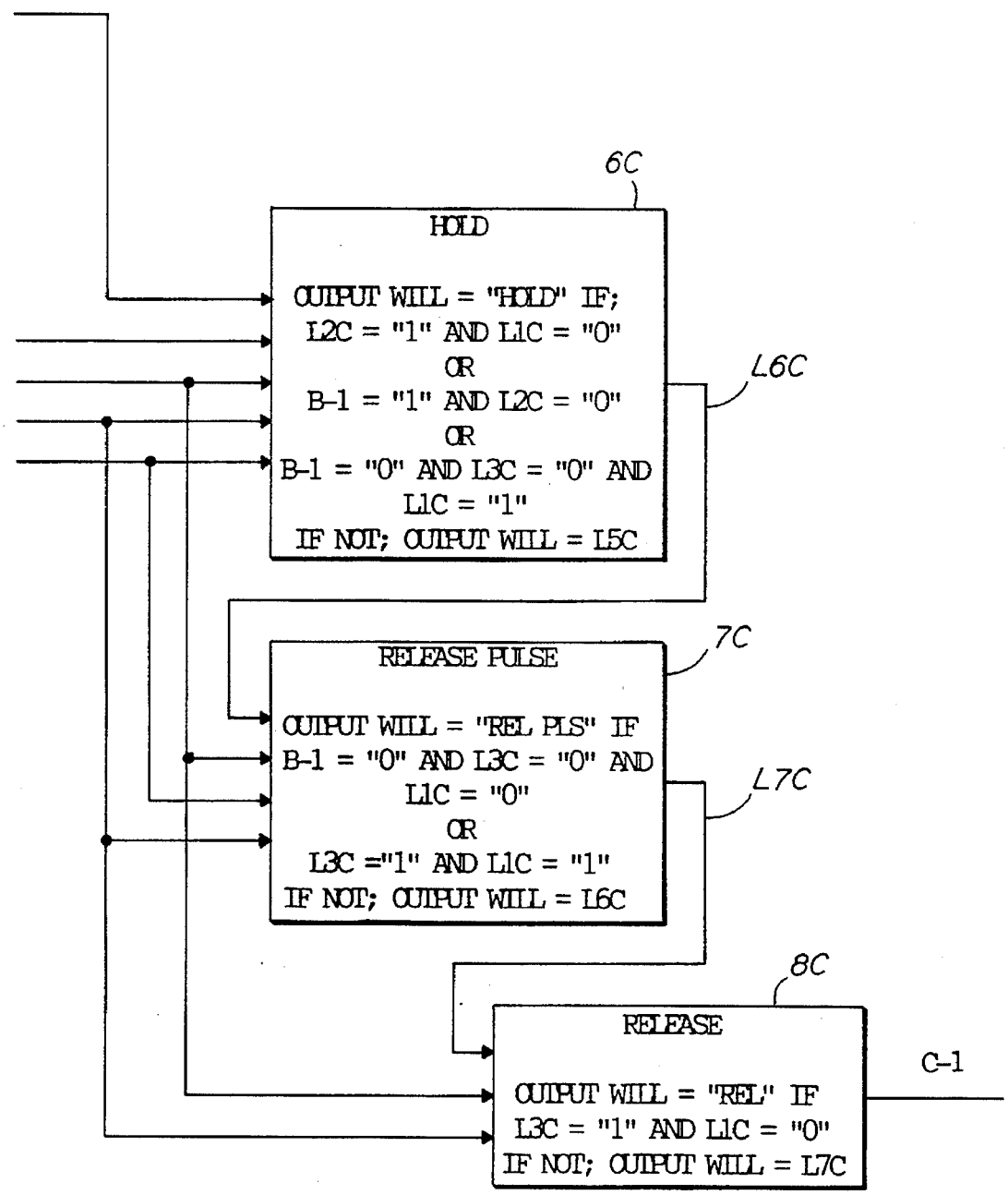

The modules A, B, and C, as are illustrated in FIGS. 1, 2, and 3 are duplicated as many times as there are axles on the railway vehicle. For the case of a microprocessor-controlled system, each logical or numeric quantity in these figures has as many storage locations as there are axles, one storage location being used for data from the corresponding axle.

The present invention provides an improved wheel slip control arrangement for modulating the brakes disposed on a passenger transit type railway vehicle having a plurality of axles on which wheels are mounted. A brief overview of a presently preferred embodiment of this wheel slip control system is described below.

Apparatus is provided which is connected to at least receive signals indicating the speeds of the axles. These are items 2E, 3E, 4E, and 5E, as well as items 6E, 7E, 8E, and 9E in FIG. 5. During a time when the train is moving, but when wheel slip is known not to be occurring, normalization factors are obtained which compensate for differences in wheel diameters, which may be caused by wear of the wheels. From these particular factors, normalized axle speeds are obtained, which are all equal if wheel slip is not occurring.

Item 10E selects a highest normalized axle speed. For each axle, the normalized axle speed is communicated to items 3A and 7A, in FIG. 1, which generate an energy constant and a speed constant, respectively. The highest axle speed is communicated to item 8A, which calculates the difference in speed between the axle and the axle with the highest normalized speed. This difference, after comparison with the speed constant calculated in Item 7A is used to generate a signal indicating slip shown by normalized wheel speed.

Apparatus is also provided which is connected to at least receive signals indicative of the acceleration rates of each such axle. Item 1A tests to determine whether the acceleration rate is possible without wheel slip. Item 2A provides an energy summation based on summing the acceleration rates which cannot be obtained without wheel slip. It should be noted that the "energy summation" is not an energy as understood in arts and disciplines other than railway braking systems. It really is an indication of velocity.

Items 5A and 6A determine the intensity of wheel slip and generate a signal for priority. Item 4A compares the energy summation with the energy constant from item 3A to generate a logical signal indicating wheel slip. This is combined in an OR gate with the output of Item 9A to provide a signal indicating the detection of wheel slip.

The wheel slip control system, of the present invention, also has apparatus for processing axle acceleration rate data to obtain a signal for ending wheel slip correction. Item 1B in FIG. 2 indicates a positive rate polarity in excess of a predetermined value. Item 2B eliminates any spurious signals in the signal for rate polarity. This item 2B keeps its old value unless it receives signals for two time steps which indicate a change. Item 3B provides a signal for a transition from a negative to a positive axle acceleration.

Item 4B provides a calculation of axle energy loss due to wheel slip, and item 5B provides a timeout value based on the energy loss of the axle. Item 6B is a timer which times the wheel slip until the timeout value is reached. Item 7B generates a signal for wheel slip enable based on several other signals, which include the output of the timer, 6B, and the polarity shift detector, item 3B.

Module C shown in FIG. 3 provides for the cascaded logic which processes the signal for both brake application and release. Item 1C provides a signal indicating a polarity shift from such positive to such negative in the acceleration rate. Item 2C provides a signal which indicates that the predetermined upper limit to the acceleration rate has been exceeded. Item 4C provides a calculation of a lower limit for the acceleration rate based on the normalized axle speed, and Item 3C provides a signal which indicates an axle acceleration rate less than the lower limit. Items 5C, 6C, 7C and 8C provide a cascade of tests for the signal for brake application and release.

Item 1F receives signals which indicate the brake cylinder pressure for each truck and generate a signal F-1 which, along with the axle acceleration rate signals, is used to activate the normalization calculations in Module E.

Item 3F receives priority signals from Item 6A in FIG. 1 for the two axles on truck 1, and selects the highest priority of the two axles. This is sent to Item 5F which generates signals for the closed and open time intervals of the release pulses.

Item 4F and 6F provide the same function for the axles on truck 2.

Reference is now made, more particularly, to FIGS. 1 through FIG. 6 which are block diagrams of the wheel slip control arrangement which are provided for reference purposes during the detailed description of a presently preferred embodiment of this invention. Although not to be limited thereto and/or thereby, a high speed locomotive hauled coach car slide protection system using this process will be used by way of example. This example assumes a microprocessor control with a 20 millisecond program cycle and uses a digital wheel slip control magnet valve. (Note: analog or other force modulation approaches could be easily substituted for the digital approach used in this example.) It should, also, be noted that anyone skilled in the railway braking art could easily apply this approach to other steel wheel to steel rail vehicle applications.

The invention example makes use of the following process input signals:

AXLE RATE (four; one/axle)—This input signal is the acceleration/deceleration rate of the wheel/axle set which is being monitored for wheel slippage. It is developed from the differentiation of the speed signal which is externally supplied to the unit using this process by an outside source (i.e., speed pickup). Note; this process is to be used individually for each wheel/axle set to be monitored.

RAW AXLE SPEED (four; one/axle)—This input signal is the speed of the wheel/axle set which is being monitored for wheel slippage. It is provided by an externally supplied signal (i.e., speed pickup) to the unit using this process.

TRUCK BRAKE CYLINDER PRESSURE OR BCP (two; one/truck)—This input signal is the input from a brake cylinder pressure transducer mounted at the output of the wheel slip control magnet valve. This signal is used to determine if the train is either in a non-braking mode or a braking mode. Many times this signal is also used for diagnostic purposes.

Further, the invention example makes use of the following process output signals:

TRUCK WHEEL SLIP VALVE (two; one/truck)—This output signal is used to command the wheel slip magnet valve to one of five states. For this particular example the wheel slip magnet valve is a two coil three state magnet valve. It has the following five states:

RELEASE—Supply is closed off and the delivery is exhausted to atmosphere.

REL-PLS—Supply is closed off and the release occurs in brief pulses.

LAP—Supply and exhaust are both closed off which will hold the brake cylinder pressure at the delivery to its present level.

APPLY-L—The exhaust is closed off and the supply occurs in brief pulses. (This particular state is used for application to lap pulsing of the valve)

APPLY—The exhaust is closed off at the supply portion of the valve. Supply is connected to delivery. (This is the normally de-energized state of the valve.)

For the wheel slip detection portion—Module A, of the present invention, particular reference is now made to FIG. 1. It should be understood by persons skilled in the art that the function of such Module A will be performed for each of the individual axles disposed on the vehicle. (It should also be noted that such Module A contains the speed varying energy level wheel slip detection process which is taught in U.S. patent application Ser. No. 08/228,660, as mentioned previously.)

Module A includes the rate detection band unit, designated as 1A, which is connected to receive the following input thereto:

AXLE RATE—This particular input signal is the acceleration/deceleration rate of the wheel/axle set which is being monitored for wheel slippage and it is developed from the differentiation of the speed signal which is externally supplied to the unit using this process by an outside source (i.e., a speed pickup device).

According to the present invention the axle rate input signal is processed in a manner such that the input signal is compared to a deceleration rate level. This level is set to be indicative of the border line between a deceleration rate that the vehicle could actually produce without wheel slippage and any deceleration rate that is in the wheel slippage range.

As an output from this process if the axle rate is less than or equal to −5.2 MPHPS the output signal from this function will be a logical "1". If the input from the axle rate is greater than −5.2 MPHPS the output signal from this function will be a logical "0".

Further included in Module A is the energy summation unit, designated 2A, which is connected to receive as inputs thereto:

AXLE RATE—This particular input signal is the acceleration/deceleration rate of the wheel/axle set which is being monitored for wheel slippage. It is developed from the differentiation of the speed signal which is externally supplied to the energy summation unit 2A using this process by an outside source (i.e., a speed pickup device).

RATE DETECTION BAND—This particular input signal is the output signal of the rate band detection unit 1A. A logical "1" indicates to the process that the axle rate is below the detection value, while a logical "0" indicates to such process that it is not.

According to the presently preferred embodiment of the invention, these input signals are processed such that there is computed a value that is proportional to the energy lost by the axle while it has been in the wheel slip range. (Note; the value computed will be negative and the more negative the value implies more energy has been lost.)

The energy summation unit 2A has as an output:

If the input from 1A is equal to a logical "1", then this function will perform the following summation:

SUM=Previous SUM+(Axle Rate Input+5.2 MPHPS)

If the input from 1A is equal to a logical "0", then this function will set the summation equal to a value of 0.

Module A, illustrated in FIG. 1, further includes an energy constant unit, designated 3A, which has as an input:

NORMALIZED AXLE SPEED—This input signal is output E-1 for Axle 1, E-2 for Axle 2, E-3 for Axle 3, or E-4 for Axle 4 from Module E. This signal is the respective axles normalized speed signal.

Such energy constant unit 3A carries out a process such that there is computed from this input signal an axle speed varying constant, which is used to determine the energy level where a wheel slip will be detected.

The output of this energy constant unit 3A is determined by a look up table based on an input signal from the respective axles normalized speed. (With respect to the axle, this input signal may come from E-1, E-2, E-3, or E-4.) The input versus output table for this function is presented as follows:

| NORMALIZED SPEED | ENERGY CONSTANT |
| --- | --- |
| 0 to 10 MPH | −8.0 |
| 11 to 20 MPH | −12.0 |
| 21 to 30 MPH | −17.0 |
| 31 to 40 MPH | −24.0 |
| 41 to 50 MPH | −33.0 |
| 51 to 60 MPH | −44.0 |
| 61 to 70 MPH | −57.0 |
| 71 to 80 MPH | −72.0 |
| 81 to 90 MPH | −89.0 |
| 91 to 100 MPH | −108.0 |
| 101 to 110 MPH | −127.0 |
| 111 to 120 MPH | −145.0 |
| 121 to 130 MPH | −160.0 |
| 131 to 140 MPH | −170.0 |
| 141 to 150 MPH | −175.0 |
| 151 to 160 MPH | −175.0 |

An energy loss slip detector unit 4A, is provided in Module A and receives as inputs thereto:

ENERGY SUMMATION—This input signal is the output signal of energy summation unit 2A. This input signal is a negative summation value of the axle rate below −5.2 MPHPS from the point were the axle rate went into the wheel slippage range. On the other hand, if this input signal is 0, the axle rate is out of the detection possibility band.

ENERGY CONSTANT—This input signal is the output signal from the energy constant unit 3A. This input signal is an axle speed varying comparison value for the Energy Summation Value.

The energy loss slip detector unit 4A carries out a process therein which compares the energy summation input signal to the energy constant input signal to make the actual energy level slip detection indication.

Such energy loss slip detector unit 4A provides an output as follows:

If the input signal from the energy summation unit 2A is less than or equal to the input signal from the energy constant unit 3A, then the output from this energy loss slip detector unit 4A will be a logical "1". If, on the other hand, the input signal from the energy summation unit 2A is greater than the input signal from the energy constant unit 3A, then the output from this energy loss slip detector unit 4A will be a logical "0".

There is a wheel slip intensity detector, designated 5A, in Module A which receives the following signals as inputs thereto:

AXLE RATE—This input signal is the acceleration/deceleration rate of the wheel/axle set which is being monitored for wheel slippage. It is developed from the differentiation of the speed signal which is externally supplied to the unit using this process by an outside source (i.e., speed pickup).

ENERGY SUMMATION—This input signal is the output of the energy summation unit 2A. This input signal is a negative summation value of the axle rate below −5.2 MPHPS from the point were the axle rate went into the wheel slippage range. If this signal is 0, the axle rate is out of the detection possibility band.

ENERGY LOSS SLIP DETECTOR—This input signal is the output of energy loss slip detector unit 4A. A logical "1" indicates that a slip on the respective axle has been detected, while a logical "0" indicates that the energy loss slip detector unit 4A has not detected a wheel slip on the respective axle.

These input signals to the wheel slip intensity detector 5A are processed in a manner such that they can be used to capture the deceleration rate at the time an energy level slip detection is made. This gives an indication of how intense the wheel slip is and holds the indication until the axle rate is above the detection range.

In the presently preferred embodiment of the invention, if the input signal from the energy summation unit 2A is equal to zero, then the output signal from the wheel slip intensity detector 5A will be zero. On the other hand, if the input signal from the energy summation unit 2A is less than zero and if the input signal from the energy loss slip detector 4A transitions from a logical "0" to a logical "1", then the output signal from the wheel slip intensity detector 5A will be the respective axle rate. Any other case than the two previously identified in this paragraph will result in an output signal from such wheel slip intensity detector 5A which will be equal to the output signal from this wheel slip intensity detector 5A from the previous program cycle.

Module A further includes an axle release pulse priority determination unit, designated 6A. Such axle release pulse priority determination unit 6A receives the following as an input signal thereto:

WHEEL SLIP (W/S) INTENSITY DETECTOR—This input signal is the output signal from the wheel slip intensity detector 5A. This input signal is either the respective axles deceleration rate at the time the most recent wheel slip was detected or a value of 0.

Such axle release pulse priority determination unit 6A uses this input signal in order to determine the release pulse priority based on the wheel slip intensity. Priority is also used to determine how fast the release pulse reduces the braking force.

The output of the axle release pulse priority determination unit 6A is determined by a look up table based on an input signal from such wheel slip intensity detector 5A. The output signal from this axle release pulse priority determination unit 6A is sent to other modules, as will be explained in greater detail hereinafter, and is called A-2.

The input versus output table for this function is presented as follows:

| W/S INTENSITY LEVEL | PRIORITY | COMMENTS |
|---|---|---|
| ≦ −16 MPHPS | 1 | Highest |
| ≦ −8 MPHPS to > −16 MPHPS | 2 | 1 |
| > −8 MPHPS | 3 | Lowest |

There is a speed constant unit 7A in Module A which receives as an input thereto:

NORMALIZED AXLE SPEED—This input signal is output signal E-1 for Axle 1, E-2 for Axle 2, E-3 for Axle 3, or E-4 for Axle 4 from Module E. This input signal is the respective axles normalized speed signal.

Such speed constant unit 7A processes this input signal to provide a speed varying value which is used to compare with the axle speed difference.

An output signal from this speed constant unit 7A is determined by a look up table based on an input from the respective axles normalized speed. (With respect to the axle this input signal may come from E-1, E-2, E-3, or E-4 of Module E.)

The input versus output table for this function is presented as follows:

| NORMALIZED SPEED | SPEED CONSTANT |
|---|---|
| 0 to 10 MPH | 3 MPH |
| 11 to 20 MPH | 3 MPH |
| 21 to 30 MPH | 5 MPH |
| 31 to 40 MPH | 7 MPH |
| 41 to 50 MPH | 9 MPH |
| 51 to 60 MPH | 11 MPH |
| 61 to 70 MPH | 13 MPH |
| 71 to 80 MPH | 14 MPH |
| 81 to 90 MPH | 15 MPH |
| 91 to 100 MPH | 16 MPH |
| 101 to 110 MPH | 16 MPH |
| 111 to 120 MPH | 17 MPH |
| 121 to 130 MPH | 17 MPH |
| 131 to 140 MPH | 18 MPH |
| 141 to 150 MPH | 18 MPH |
| 151 to 160 MPH | 19 MPH |

An axle speed to highest axle speed comparison unit, designated 8A, is provided in Module A. Such axle speed to highest axle speed comparison unit 8A receives the following signals as input signals thereto:

NORMALIZED AXLE SPEED—This input signal is the output signal E-1 for Axle 1, E-2 for Axle 2, E-3 for Axle 3, or E-4 for Axle 4 from Module E. This input signal is the respective axles normalized speed signal.

HIGHEST AXLE SPEED (HAS)—This input signal is the output signal E-5 from Module E. This input signal is the highest axle speed signal of the four output signals E-1, E-2, E-3 and E-4.

Such axle speed to highest axle speed comparison unit, designated 8A, utilizes these input signals to calculate the difference between the highest axle speed on the vehicle and the respective axle.

The output signal from such axle speed to highest axle speed comparison unit 8A is equal to the respective axles normalized speed (With respect to the axle this input signal may come from E-1, E-2, E-3, or E-4 of Module E.) subtracted from the HAS (The Highest Axle Speed input signal from E-5 of Module E). The output signal from this axle speed to highest axle speed comparison unit 8A is communicated to other modules, as will be described hereinafter, and is called A-3.

Additionally, there is a speed difference detection unit 9A in Module A. Such speed difference detection unit 9A as input signals thereto:

SPEED CONSTANT—This input signal is the output signal from the speed constant unit 7A. This input signal is an axle speed varying comparison value for the Axle Speed To Highest Axle Speed Comparison Value.

AXLE SPEED TO HIGHEST AXLE SPEED COMPARISON—This input signal is the output signal from the axle speed to highest axle speed comparison unit 8A. This input signal is a value of the speed difference between the respective axle and the highest speed axle on the vehicle.

The function of such speed difference detection unit 9A is to compare the speed varying constant with the respective axles speed difference. An axle speed difference which is greater than the speed varying constant are considered a speed difference wheel slip detection.

If the input signal from the axle speed to highest axle speed comparison unit 8A is greater than or equal to the input signal from the speed constant unit 7A, then the output signal from the speed difference detection unit 9A will be a logical "1". If, however, the input signal from such axle speed to highest axle speed comparison unit 8A is less than the input signal from the speed constant unit 7A, then the output signal such speed difference detection unit 9A will be a logical "0".

Finally, Module A includes an OR gate detection unit, designated 10A. Such OR gate detection unit 10A receives the following signals as inputs thereto:

ENERGY LOSS SLIP DETECTOR—This input signal is the output signal of the energy loss slip detection unit 4A. A logical "1" indicates that a slip on the respective axle has been detected, while a logical "0" indicates that the energy loss slip detector 4A has not detected a slip on the respective axle.

SPEED DIFFERENCE DETECTION—This input signal is the output signal of the speed difference detection unit 9A. A logical "1"indicates that a slip on the respective axle has been detected, while a logical "0" indicates that the speed difference detection unit 9A has not detected a slip on the respective axle.

The function of the OR gate detection unit 10A is a logical "OR" function. This function OR's the Energy Loss Wheel Slip Detection with the Speed Difference Wheel Slip Detection, producing the respective axle's wheel slip detection signal.

According to the presently preferred embodiment of the invention, if the input signal from the energy loss slip detector unit 4A is equal to a logical "1", or the input signal from the speed difference detection unit 9A is equal to a logical "1", then the output signal from such OR gate detection unit 10A will equal a logical "1". If, however, the input signal from such energy loss slip detector unit 4A is equal to a logical "0", and the input signal from such difference detection unit 9A is equal to a logical "0", then the output signal from such OR gate detection unit 10A will equal a logical "0".

Particular reference is now made to FIG. 2. Illustrated therein is a presently preferred embodiment of a wheel slip correction and polarity unit, hereinafter referred to as Module B. It is important to note here that the function of this Module B will be performed for each individual axle on the vehicle. It should also be noted that Module B contains the "Rate Polarity Shift Wheel-Slip Control System" taught in U.S. Pat. No. 4,491,920.

Module B includes a rate polarity unit, designated 1B which will receive as an input signal thereto:

AXLE RATE—This input signal is the acceleration/ deceleration rate of the wheel/axle set which is being monitored for wheel slippage. It is developed from the differentiation of the speed signal which is externally supplied to the rate polarity unit 1B using this process by an outside source (i.e., speed pickup).

Such rate polarity unit 1B determines if the axle rate is positive or negative in polarity. This rate polarity unit 1B is provided with a small hysteresis band and does not necessarily transition at a 0 axle rate.

In the presently preferred embodiment of the invention, if the input signal from the respective axle rate becomes greater than or equal to 0.6 MPHPS, then the output signal of this rate polarity unit 1B will become a logical "1". Furthermore, the output signal of such rate polarity unit 1B will remain a logical "1" until such time as the input signal from the respective axles rate becomes less than or equal to 0.0 MPHPS, then the output signal of this rate polarity unit 1B will become a logical "0".

In addition, Module B includes a positive polarity detection unit, designated 2B.

There is an input signal to such positive polarity detection unit 2B as follows:

RATE POLARITY—This input signal is the output signal from the rate polarity unit 1B. A logical "1" will indicate the axle rate is in the positive range, while a logical "0"indicates it is not.

This positive polarity detection unit 2B is provided in Module B to require a two program cycle pattern before a rate polarity change is acknowledged. This two program cycle pattern minimizes the effect of rate signal noise.

According to the invention, if the input signal from such rate polarity unit 1B goes from a logical "0" to a logical "1" and remains a logical "1" for two program cycles, then the output signal from such this positive polarity detection unit 2B will become a logical "1". Additionally, the output signal of this positive polarity detection unit 2B will remain a logical "1" until the input signal from the rate polarity unit 1B remains a logical "0" for two program cycles. The output signal of the positive polarity detection unit 2B is communicated to other Modules as B-1.

Module B, also, contains a polarity shift detection unit, designated 3B. Such polarity shift detection unit 3B receives as an input signal thereto:

RATE POLARITY DETECTION—This input signal is the output signal of the positive polarity detection unit 2B. A logical "1" indicates the axle rate has been consistently in the positive range for two program cycles, while a logical "0"indicates the axle rate has been consistently in the negative range for two program cycles. In this embodiment, this polarity shift detection unit 3B is used to determine the fact that the axle rate has transitioned from positive to negative. This is the primary indication of a wheel slip correction.

If the input signal from the positive polarity detection unit 2B transitions from a logical "1" to a logical "0", then the output signal of this polarity shift detection unit 3B will become a logical "1" for one program cycle. For all other input signal conditions, the output signal from such polarity shift detection unit 3B will remain a logical "0".

Another component in Module B is a post detection energy loss unit designated 4B. Such post detection energy loss unit 4B receives as the following signals as inputs thereto:

AXLE RATE—This input signal is the acceleration/ deceleration rate of the wheel/axle set which is being monitored for wheel slippage. It is developed from the differentiation of the speed signal which is externally supplied to the post detection energy loss unit 4B using this process by an outside source (i.e., speed pickup).

AXLE SPEED TO HIGHEST AXLE SPEED COMPARISON—This input signal is A-3 (i.e., the output signal from the axle speed to highest axle speed comparison unit 8A). This input signal, is a value of the speed difference between the respective axle and the highest speed axle on the vehicle.

WHEEL SLIP ENABLE—This input signal is B-3 (i.e., the output signal from wheel slip enable unit 7B). A logical "1"indicates the wheel slip control is enabled (i.e., actively controlling a slip). A logical "0" indicates the wheel slip control is disabled (i.e., not controlling a slip).

This post detection energy loss unit 4B determines the respective axles energy loss (in terms of speed) from detection to the point where the axle begins to correct. Such post detection energy loss unit 4B is used to indicate whether a wheel slip detection is legitimate or a false slip detection.

If the input signal B-3 from the wheel slip enable unit 7B is equal to a logical "0", then the output signal of such post detection energy loss unit 4B is a value of 0. If the input signal B-3 from such wheel slip enable unit 7B is equal to a logical "1", then there are two possibilities for the post detection energy loss unit's output signal. The calculation of each possibility will be run and the greatest value of the two possibilities will be used. The two calculations are performed as follows:

a). If the respective axle rate is greater than –5.2 MPHPS, then the output of this function will be equal to the output of this function from the previous program cycle. If the respective axle rate is less than or equal to –5.2 MPHPS, then the output signal of the post detection energy loss unit 4B will be equal to the following equation:

Output=Previous Output–(0.02* (Axle Rate +5.2 MPHPS))

b). The input signal from energy constant unit A-3, Module A. As stated previously, if a) is greater than or equal to b), then the output will be a). If a) is less than b), then the output will be b).

There is a timer table designated 5B in Module B which receives as an input signal thereto:

POST DETECTION ENERGY LOSS—This input signal is the output signal of the post detection energy loss unit 4B. This input signal will give the respective axles energy loss (in terms of speed) from detection, to the point where the axle begins to correct.

Such timer table 5B sets the wheel slip enable timeout value based on the post detection energy loss unit 4B. A false slip detection will have a low energy loss and be given a short slip enable timeout value. A legitimate severe slip detection will have a large energy loss and be given a long slip enable timeout value.

The output signal from this timer table 5B is determined by a look up table based on an input signal from such post detection energy loss unit 4B.

The input versus output table for this function is presented as follows:

| POST DET. ENERGY LOSS | TIMEOUT |
| --- | --- |
| ≦0.1 | 0.080 sec |
| >0.1 to 0.3 | 0.280 sec |
| >0.3 to 0.5 | 0.460 sec |
| >0.5 to 0.7 | 0.640 sec |
| >0.7 to 0.9 | 0.820 sec |
| >0.9 to 1.1 | 1.000 sec |
| >1.1 to 1.3 | 1.180 sec |
| >1.3 to 1.5 | 1.360 sec |
| >1.5 to 1.7 | 1.540 sec |
| >1.7 to 1.9 | 1.720 sec |
| >1.9 to 2.1 | 1.900 sec |
| >2.1 to 2.3 | 2.080 sec |
| >2.3 to 2.5 | 2.280 sec |
| >2.5 | 2.500 sec |

Another component of Module B is an enable timer which is designated 6B. Such enable timer 6B receives the following signals as an inputs thereto:

TIMER TABLE—This input signal is the output signal from the timer table 5B. This input signal provides the wheel slip enable timeout value.

WHEEL SLIP ENABLE—This input signal is the output signal of the wheel slip enable unit 7B. A logical "1"indicates the wheel slip control is enabled (i.e., actively controlling a slip). A logical "0" indicates the wheel slip is disabled (i.e., not controlling a slip).

This timer enable unit 6B begins the timeout count down, whenever the respective axle's wheel slip logic is enabled. Additionally, such timer enable unit 6B will then allow the timeout value to increase while the timer enable unit 6B is counting down, but will not allow the timeout value to decrease while it is counting down. When the timer has counted down to zero a signal is communicated to the wheel slip enable unit 7B. This output signal is used as a wheel slip correction indication.

If the input signal B-3 from the wheel slip enable unit 7B is equal to a logical "0", then the output signal from this timer enable unit 6B will be 0. If the input signal B-3 from such wheel slip enable unit 7B is equal to a logical "1", then the operation of this enable timer unit 6B will be affected in the following manner:

When the input signal from B-3 changes to a logical "1" a timer will begin counting down from the number input from such timer table 5B. If timer table unit 5B increases while the timer is counting down the timer value will be reset to the increased value. If timer table unit 5B decreases, the timer value will continue to count down from the maximum value input from 5B.

During the time when the timer is "Counting Down" the output signal of this function will be a logical "0". When the timer reaches "Timeout" this function will send out an output signal of a logical "1" for one program cycle.

As has been mentioned above Module B includes a wheel slip enable unit 7B. Such wheel slip enable unit 7B receives the following signals as inputs thereto:

POLARITY SHIFT DETECTION—This input signal is the output signal from the polarity shift detection unit 3B. When the respective axles rate has shifted from a positive polarity to a negative polarity this input signal will be a logical "1" for one program cycle. This input signal will be a logical "0" for all other conditions.

POWER/BRAKE (PWR/BRK)—This input signal is the output signal F-1 from Module F which will be described in greater detail hereinafter. This input signal is a logical "1" when the vehicle is not in a braking mode. This input signal, however, is a logical "0" when the vehicle is in a braking mode.

ENABLE TIMER—This input signal is the output signal from the enable timer 6B. When an enable timeout occurs, this input signal will be a logical "1" for one program cycle. However, this input signal will be a logical "0" for all other conditions.

ZERO SPEED DETERMINATION (ZSPD)—This input signal is the output signal D-1 from Module D which will be described in greater detail hereinafter. This input signal is a logical "1" when the vehicle is not moving or moving at an almost imperceptible speed. On the other hand, this input signal is a logical "0" when the vehicle is moving.

DETECTION—This input signal is the output signal A-1 from Module A of the respective axle. This input signal is a logical "1" when the respective axles' detection logic, in Module A, has detected a potential slide. Otherwise, this input signal is a logical "0" under all normal operational conditions.

RELEASE (Force Command)—This input signal is the output signal C-1 from Module C which will be described in more detail hereinafter. This input signal is the force modulation command from the slip controlling logic of Module C.

According to the presently preferred embodiment of the invention, the wheel slip enable unit 7B performs two general tasks. The first task is to indicate to the logic that a wheel slip correction is or is not in process on the respective axle. The second task is to send out the appropriate force modulation command for the respective axle.

Such wheel slip enable unit 7B will become "Enabled" when the input signal from A-1 of Module A is equal to a logical "1". The wheel slip enable unit 7B will remain "Enabled" until one of the following occurrences "Disables" it:

If the input signal from the polarity shift detection unit 3B is equal to a logical "1", then this wheel slip enable unit 7B is "Disabled".

If the input signal F-1 from Module F is equal to a logical "1", then such wheel slip enable unit 7B is "Disabled".

If the input signal D-1 from Module D is equal to a logical "1", then such wheel slip enable unit 7B is "Disabled".

If the input signal from the enable timer unit 6B is equal to a logical "1", then this wheel slip enable unit 7B is "Disabled".

When such wheel slip enable unit 7B is "Disabled", output signal B-2 will equal APP (i.e., the code for brake force application) and output signal B-3 will be equal to a logical "0". When such wheel slip enable unit 7B is "Enabled", output signal B-2 will equal input signal C-1 from Module C and. output signal B-3 will be equal to a logical "1". The output signals B-2 and B-3 are communicated to other modules utilized in the presently preferred embodiment of the invention.

Reference is now made, more particularly, to FIG. 3. Illustrated therein is a presently preferred embodiment of a wheel slip axle force commands unit, hereinafter referred to as Module C.

It should be noted here that the function of this Module C will be performed for each individual axle disposed on the vehicle.

Module C includes a rate direction unit designated 1C. Such rate direction unit 1C receives the following signal as an input thereto:

AXLE RATE—This input signal is the acceleration/deceleration rate of the wheel/axle set which is being monitored for wheel slippage. It is developed from the differentiation of the speed signal which is externally supplied to the rate direction unit 1C using this process by an outside source (i.e., speed pickup).

Such rate direction unit 1C is used to indicate whether the respective axle rate is moving in a positive or a negative direction.

If the respective axle rate input signal minus the previous program cycles axle rate is less than or equal to 0 (i.e., the negative direction), then the output signal from such rate direction unit 1C will be equal to a logical "0". If the respective axle rate input signal minus the previous program cycles axle rate is greater than 0 (i.e., the positive direction), then the output signal of this rate direction unit 1C will be equal to a logical "1".

Module C, also, includes a rate upper band unit designated 2C. Such rate upper band unit 2C receives the following signal as an input signal thereto.

AXLE RATE—This input signal is the acceleration/deceleration rate of the wheel/axle set which is being monitored for wheel slippage. It is developed from the differentiation of the speed signal which is externally supplied to the rate upper band unit 2C using this process by an outside source (i.e., speed pickup).

As will be appreciated by persons skilled in the wheel slip control art during the time between wheel slip detection and the indication of correction, the wheel slip control seeks to keep the axle rate in the axle rate control band. Being above this band indicates that more braking force is needed. This rate upper band unit 2C is used in the present invention to indicate that the respective axle rate is above or equal to the upper limit of the axle rate control band.

If the respective axle rate input signal is greater than or equal to 5.0 MPHPS, then the output signal of this rate upper band unit 2C will be equal to a logical "1". If, however, the respective axle rate input signal is less than 5.0 MPHPS, then the output signal of such rate upper band unit 2C will be equal to a logical "0".

Included in Module C is a rate lower band unit designated 3C. Such rate lower band unit 3C receives the following signals as inputs thereto:

AXLE RATE—This input signal is the acceleration/deceleration rate of the wheel/axle set which is being monitored for wheel slippage. It is developed from the differentiation of the speed signal which is externally supplied to the rate lower band unit 3C using this process by an outside source (i.e., speed pickup).

RATE LOWER BAND (RLB) CONSTANT—This input signal is the output signal of a rate lower band constant unit 4C. This input signal is an axle speed varying comparison value for the respective Axle Rate Value.

According to the present invention, being below the axle rate control band indicates that braking force needs to be reduced. Therefore, the rate lower band unit 3C is used to indicate that the respective axle rate is below or equal to the respective axle speed varying lower limit of the axle rate control band.

If the respective axle rate input is less than or equal to the input from the rate lower band constant unit 4C, then the output signal of such rate lower band unit 3C will be equal to a logical "1". If, however, the respective axle rate input is greater than the input from the rate lower band constant 4C, then the output signal of such rate lower band unit 3C will be equal to a logical "0".

As discussed above, Module C further includes the rate lower band (RLB) constant unit designated 4C. Rate lower band constant unit 4C receives the following signal as an input thereto:

NORMALIZED AXLE SPEED—This input signal is output signal E-1 for Axle 1, E-2 for Axle 2, E-3 for Axle 3, or E-4 for Axle 4 from Module E. This input signal is the respective axles normalized speed signal.

The rate lower band constant unit 4C is used to vary the rate lower band in proportion to the respective axle's speed.

The output signal from this rate lower band constant unit 4C is determined by a look up table based on an input signal from the respective axles normalized speed. (With respect to the axle this input may come from E-1, E-2, E-3, or E-4 of Module E.)

The input versus output table for this function is presented as follows:

| NORMALIZED SPEED | RLB CONSTANT |
| --- | --- |
| 0 to 10 MPH | −1 MPHPS |
| 11 to 20 MPH | −2 MPHPS |
| 21 to 30 MPH | −4 MPHPS |
| 31 to 40 MPH | −5 MPHPS |
| 41 to 50 MPH | −6 MPHPS |
| 51 to 60 MPH | −6 MPHPS |
| 61 to 70 MPH | −6 MPHPS |
| 71 to 80 MPH | −6 MPHPS |
| 81 to 90 MPH | −5 MPHPS |
| 91 to 100 MPH | −5 MPHPS |
| 101 to 110 MPH | −5 MPHPS |
| 111 to 120 MPH | −4 MPHPS |
| 121 to 130 MPH | −4 MPHPS |
| 131 to 140 MPH | −4 MPHPS |
| 141 to 150 MPH | −2 MPHPS |
| 151 to 160 MPH | −2 MPHPS |

An applied pulse unit designated 5C is still another component of Module C. Such applied pulse unit 5C receives the following signals as inputs thereto:

RATE DIRECTION—This input signal is the output signal of rate direction unit 1C. A logical "1" provided by this input signal, indicates to the process that the respective axle rate is heading in the positive direction. A logical "0" provided by this input signal, indicates that the respective axle rate is heading in the negative direction or holding constant.

RATE UPPER BAND—This input signal is the output signal of the rate upper band 2C. A logical "1" provided by this input signal, indicates to the process that the respective axle rate is above or equal to the upper limit of the axle rate control band. A logical "0" provided by this input signal, indicates to the process that the respective axle rate is below the upper limit of the axle rate control band.

In the invention, the applied pulse unit 5C is utilized to indicate to the process the need for an application pulse force modulation command.

If the input signal from such rate direction unit 1C and the input signal from such rate upper band unit 2C are equal to a logical "1", then the output signal of this applied pulse unit 5C will be equal; to "APP_PLS" (i.e., application pulse). If the input signal from the rate direction unit 1C or the input signal from the upper rate band unit 2C are equal to a logical "0", then the output signal of this applied pulse unit 5C will be equal; to "APP" (i.e., application).

A hold unit designated 6C is another element of Module C. Such hold unit 6C receives the following signals as inputs thereto:

APPLY PULSE—This input signal is the output signal of the applied pulse unit 5C. This input signal will be a force modulation command of either "APP" or "APP_PLS".

RATE UPPER BAND—This input signal is the output signal of the rate upper band unit 2C. A logical "1" from this input signal, indicates to the process that the respective axle rate is above or equal to the upper limit of the axle rate control band. A logical "0" from this input signal, indicates to the process that the respective axle rate is below the upper limit of the axle rate control band.

RATE DIRECTION—This input signal is the output signal of the rate direction unit 1C. A logical "1" from this input signal, indicates to the process that the respective axle rate is heading in the positive direction. A logical "0" from this input signal, indicates to the process that the respective axle rate is heading in the negative direction or holding constant.

RATE LOWER BAND—This input signal is the output signal of the rate lower band unit 3C. A logical "1" from this input signal, indicates to the process that the respective axle rate is below or equal to the respective axle speed varying lower limit of the axle rate control band. A logical "0" from this input signal, indicates to the process that the respective axle rate is above the respective axle speed varying lower limit of the axle rate control band.

POSITIVE POLARITY DETECTION—This input signal is the output signal B-1 from Module B. A logical "1" indicates to the process that the axle rate has been consistently in the positive range for two program cycles, while a logical "0"indicates to the process that the axle rate has been consistently in the negative range for two program cycles. This hold unit 6C is used to indicate to the process the need for a hold force modulation command.

The output signal of hold unit 6C will be "HOLD" if any of the following conditions are true:

If the input signal from the rate upper band unit 2C is equal to a logical "1" and if the input signal from the rate direction unit 1C is equal to a logical "0".

If input signal B-1 from Module B is equal to a logical "1" and if the input signal from such rate upper band unit 2C is equal to a logical "0".

If input signal B-1 from Module B is equal to a logical "0" and if the input signal from such rate lower band unit 3C is equal to a logical "0" and the input signal from such rate direction unit 1C is equal to a logical "1".

The output signal of this apply pulse unit 5C will be the input signal from 5C for any other conditions.

Another component of such Module C is a release pulse unit designated 7C. Release pulse unit 7C receives the following signals as inputs thereto:

HOLD—This input signal is the output signal of such hold unit 6C. This input signal will be a force modulation command of either "APP", "APP_PLS", or "HOLD".

RATE DIRECTION—This input signal is the output signal of the rate direction unit 1C. A logical "1" from this input signal, indicates to the process that the respective axle rate is heading in the positive direction. A logical "0" from this input signal, indicates to the process that the respective axle rate is heading in the negative direction or holding constant.

POSITIVE POLARITY DETECTION—This input signal is the output signal B-1 from Module B. A logical "1" indicates to the process that the axle rate has been consistently in the positive range for two program cycles, while a logical "0"indicates to the process the axle rate has been consistently in the negative range for two program cycles.

RATE LOWER BAND—This input signal is the output signal of the rate lower band unit 3C. A logical "1" from this input signal, indicates to the process that the respective axle rate is below or equal to the respective axle speed varying lower limit of the axle rate control band. A logical "0" from this input signal, indicates to the process that the respective axle rate is above the respective axle speed varying lower limit of the axle rate control band.

This release pulse unit 7C is used to indicate to the process the need for a release pulse force modulation command.

The output signal of this release pulse unit 7C will be "REL_PLS" (i.e., release pulse) if any of the following conditions are true:

If the input signal B-1 from Module B is equal to a logical "0" and if the input signal from such rate lower band unit 3C is equal to a logical "0" and the input signal from such rate direction unit 1C is equal to a logical "0".

If the input signal from the rate lower band unit 3C is equal to a logical "1" and if the input signal from such rate direction unit 1C is equal to a logical "1".

The output signal of this release pulse unit 7C will be the input signal to such release pulse unit 7C from such hold unit 6C for any other conditions.

The final component in Module C is a release unit designated 8C. Such release unit 8C receives the following signals as inputs thereto:

RELEASE PULSE—This input signal is the output signal of the release pulse unit 7C. This input signal will be a force modulation command of either "APP", "APP_PLS", "HOLD", or "REL_PLS".

RATE DIRECTION—This input signal is the output signal of such rate direction unit 1C. A logical "1" from this input signal, indicates to the process that the respective axle rate is heading in the positive direction. A logical "0" from this input signal, indicates to the process that the respective axle rate is heading in the negative direction or holding constant.

RATE LOWER BAND—This input signal is the output signal of the rate lower band unit 3C. A logical "1" from this input signal, indicates to the process that the respective axle rate is below or equal to the respective axle speed varying lower limit of the axle rate control band. A logical "0" from this input signal, indicates to the process that the respective axle rate is above the respective axle speed varying lower limit of the axle rate control band.

This release unit 8C is used in the invention to indicate to the process the need for a release force modulation command.

The output signal of this release unit 8C will be "REL" (i.e., release) if the following condition is true:

If the input signal from such rate lower band unit 3C is equal to a logical "1" and if the input signal from such rate direction unit 1C is equal to a logical "0".

The output signal of this release unit 8C will be same as the input signal received from such release pulse unit 7C for any other conditions.

Figure 4A:
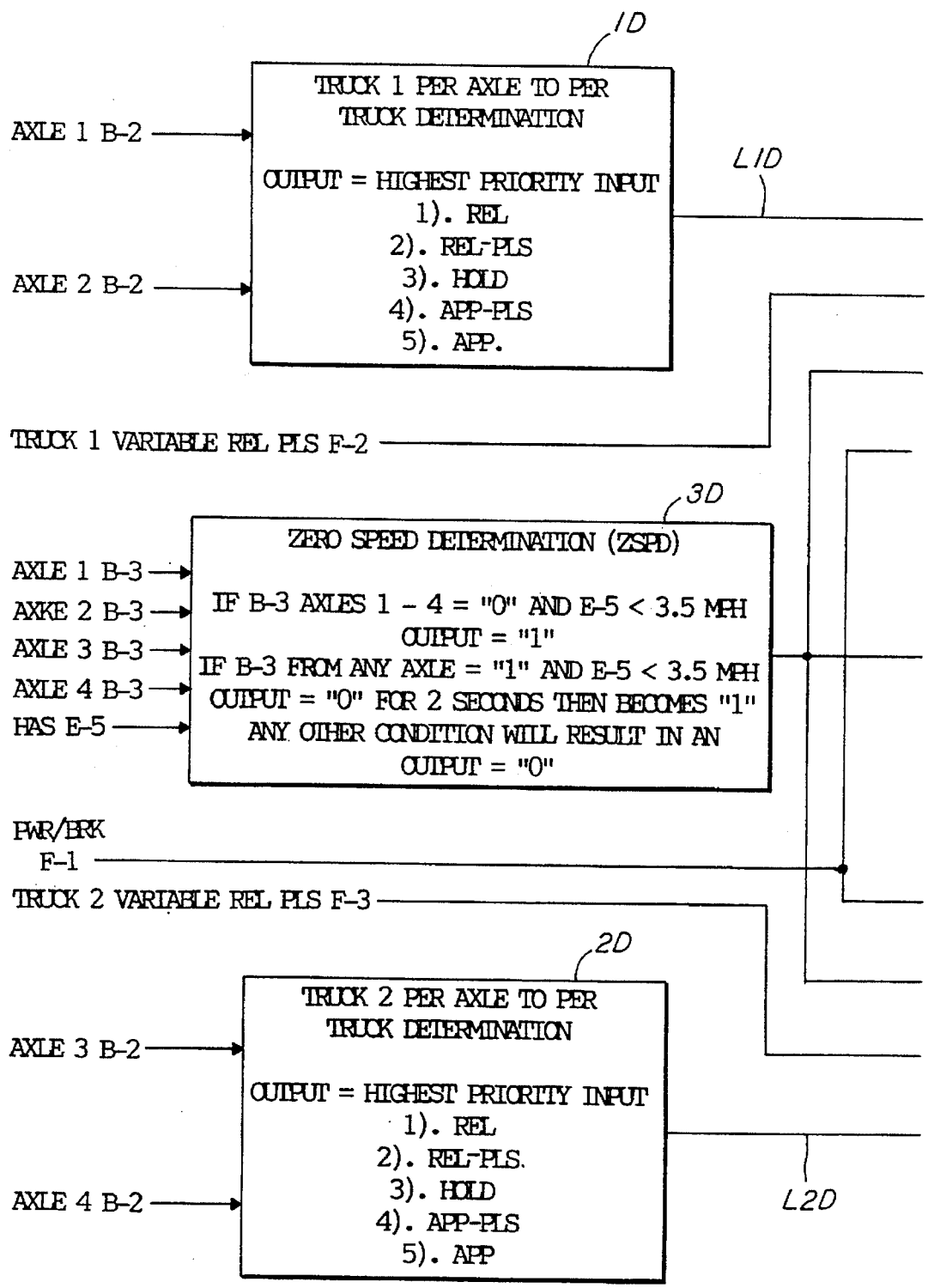
FIGS. 4A–4B are a block diagram of Module D, which is performed on a per vehicle basis to compare priorities for brake release for the axles on a truck, and release brakes on the basis of a highest priority for the two axles on a truck.
Figure 4B:
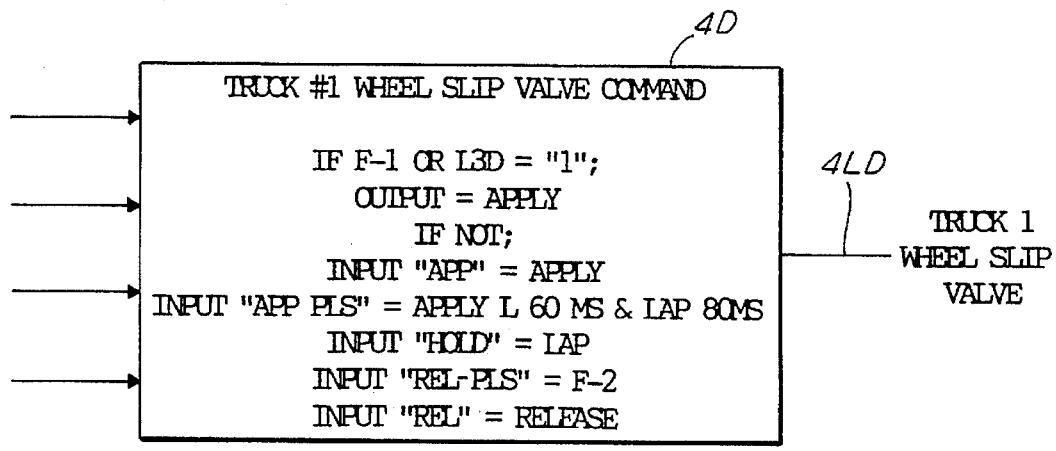
Figure 4B:
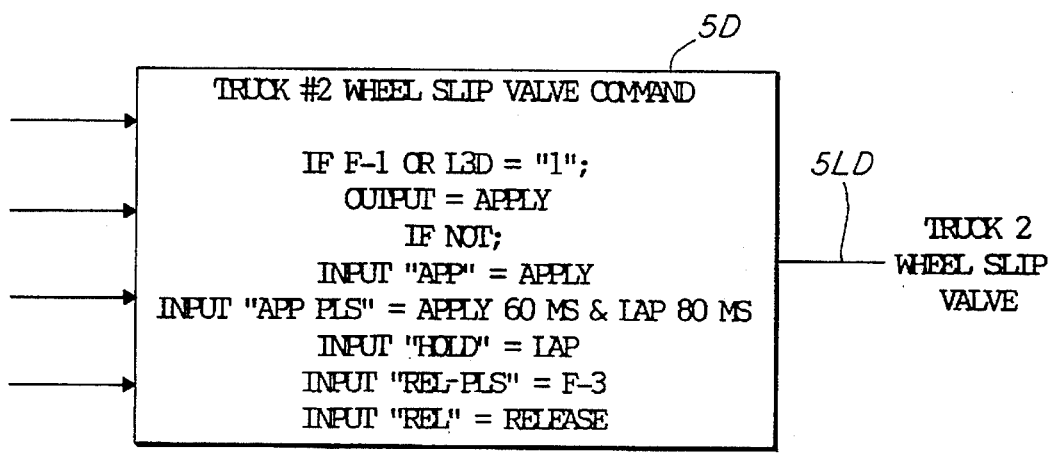

Reference is made, more particularly, to FIG. 4. Illustrated therein is a presently preferred embodiment of a wheel slip valve commands and zero speed unit (ZSPD), hereinafter referred to as Module D.

It should be noted here that the function of this Module D will be performed on a per vehicle basis.

According to the presently preferred embodiment of the invention Module D includes a truck 1 per axle to per truck determination unit designated 1D. Such truck 1 per axle to per truck determination unit 1D receives the following signals as inputs thereto:

WHEEL SLIP ENABLE AXLE 1—This input signal is the output signal B-2 from Module B of axle 1. This input signal is a force modulation command. If axle 1 is "Enabled", the force modulation command will be output signal C-1 from Module C of axle 1. If axle 1 is "Disabled", the force modulation command will be "APP".

WHEEL SLIP ENABLE AXLE 2—This input signal is the output signal B-2 from Module B of axle 2. This input signal is a force modulation command. If axle 2 is "Enabled", the force modulation command will be output signal C-1 from Module C of axle 2. If axle 2 is "Disabled", the force modulation command will be "APP".

This truck 1 per axle to per truck determination unit 1D is used, according to the invention, to pick the axle on truck 1 which has the highest priority wheel slip control force modulation command and then send that command on to the actual force modulation control logic. Release has the highest priority, because if an axle's control logic is calling for a release, it is probably close to sliding. At the other extreme, if an axle's control logic is calling for an application, it is not in danger of sliding. (Note: this truck 1 per axle to per truck determination unit 1D would not be needed on a system using a per axle force modulation approach.)

The input signal from B-2 of Axle 1 is compared to the input signal from B-2 of Axle 2. The input signal with the highest priority will be the output signal of such truck 1 per axle to per truck determination unit 1D. The priority ranking is listed as follows:

| PRIORITY | FORCE COMMAND | COMMENTS |
| --- | --- | --- |
| 1 | "REL" - Full Force Reduction | Highest |
| 2 | "REL_PLS" - Pulsed Force Reduction | |
| 3 | "HOLD" - Hold Force | ↕ |
| 4 | "APP_PLS" - Pulsed Force Increase | |
| 5 | "APP" - Full Force Increase | Lowest |

Module D also includes a truck 2 per axle to per truck determination unit designated 2D. This truck 2 per axle to per truck determination unit 2D receives as inputs thereto the following signals:

WHEEL SLIP ENABLE AXLE 3—This input signal is the output signal B-2 from Module B of axle 3. This input signal is a force modulation command. If, for example, axle 3 is "Enabled", the force modulation command will be the output signal C-1 from Module C of axle 3. If, on the other hand, axle 3 is "Disabled", the force modulation command will be "APP".

WHEEL SLIP ENABLE AXLE 4—This input signal is the output signal B-2 from Module B of axle 4. This input signal is, also, a force modulation command. If axle 4 is "Enabled", the force modulation command will be the output signal C-1 from Module C of axle 4. If axle 4 is "Disabled", the force modulation command will be "APP".

The truck 2 per axle to per truck determination unit 2D is used, according to the present invention, to pick the axle disposed on truck 2 which has the highest priority wheel slip control force modulation command and then send that command on to the actual force modulation control logic. Release has the highest priority, because if an axle's control logic is calling for a release, it is probably close to sliding. At the other extreme, if an axle's control logic is calling for an application, it is not in danger of sliding. (It should be noted that this truck 2 per axle to per truck determination unit 2D would not be needed on a wheel slip control system which is utilizing a per axle force modulation approach.)

The input signal from B-2 of Axle 3 is compared to the input signal from B-2 of Axle 4. The input signal with the highest priority will be the output signal from such truck 2 per axle to per truck determination unit 2D.

The priority ranking is listed as follows:

| PRIORITY | FORCE COMMAND | COMMENTS |
| --- | --- | --- |
| 1 | "REL" - Full Force Reduction | Highest |
| 2 | "REL_PLS" - Pulsed Force Reduction | |
| 3 | "HOLD" - Hold Force | ↕ |
| 4 | "APP_PLS" - Pulsed Force Increase | |
| 5 | "APP" - Full Force Increase | Lowest |

In the present invention, such Module D includes a zero speed determination unit designated 3D. Such zero speed determination unit 3D receives the following signals as inputs thereto:

WHEEL SLIP ENABLE AXLE 1—This input signal is the output signal B-3 from Module B of axle 1. A logical "1" indicates to the process of the invention that the wheel slip control is enabled (i.e., actively controlling a slip). A logical "0" indicates to the process that the wheel slip is disabled (i.e., not controlling a slip).

WHEEL SLIP ENABLE AXLE 2—This input signal is the output signal B-3 from Module B of axle 2. A logical "1" indicates to the process that the wheel slip control is enabled (i.e., actively controlling a slip). A logical "0" indicates to the process that the wheel slip is disabled (i.e., not controlling a slip).

WHEEL SLIP ENABLE AXLE 3—This input signal is the output signal B-3 from Module B of axle 3. A logical "1" indicates to the process that the wheel slip control is enabled (i.e., actively controlling a slip). A logical "0" indicates to the process that the wheel slip is disabled (i.e., not controlling a slip).

WEEEL SLIP ENABLE AXLE 4—This input signal is the output signal B-3 from Module B of axle 4. A logical "1" indicates to the process that the wheel slip control is enabled (i.e., actively controlling a slip). A logical "0" indicates to the process that the wheel slip is disabled (i.e., not controlling a slip).

HIGHEST AXLE SPEED (HAS)—This input signal is output signal E-5 from Module E. This input signal is the highest axle speed signal of the four.

According to the present invention, below a 3 MPH vehicle speed, it would be expected that wheel slip control is not needed and can cause unnecessary brake force reduction. The zero speed determination unit 3D is used to determine if the speed of the vehicle is below 3 MPH and that this is not caused by slips on all axles.

If the input signal B-3 from Module B for Axle 1, Axle 2, Axle 3, and Axle 4 are all equal to a logical "0" and the input signal E-5 from Module E is less than 3.5 MPH, then the output signal of this zero speed determination unit 3D will be a logical "1". If, however, an input signal B-3 from Module B for Axle 1, Axle 2, Axle 3, or Axle 4 is equal to a logical "1" and the input signal E-5 from Module E is less than 3.5 MPH, then the output signal of this zero speed determination unit 3D will be a logical "0" for 2.0 seconds and then become a logical "1". Any other condition will result in an output signal of a logical "0" from such zero speed determination unit 3D. The output signal from the zero speed determination unit 3D will be communicated to other modules as D-1.

Module D further includes a truck 1 wheel slip valve command unit 4D. Such truck 1 wheel slip valve command unit 4D receives the following signals as inputs thereto:

TRUCK 1 PER AXLE TO PER TRUCK DETERMINATION—This input signal is the output signal of such truck 1 per axle to per truck determination unit 1D. This input signal is the highest priority force modulation command for truck 1.

TRUCK 1 VARIABLE REL_PLS—This input signal is the output signal F-2 from Module F of truck 1. This input signal will be the release time and the lap time needed to create a release pulse valve command.

ZERO SPEED DETERMINATION (ZSPD)—This input signal is the output signal D-1 from Module D. This input signal is a logical "1" when the vehicle is not moving or is moving at an almost imperceptible speed. This input signal, on the other hand, is a logical "0" when the vehicle is moving.

This truck 1 wheel slip valve command unit 4D is used, according to the present invention, to convert the general force modulation command for truck 1 to the actual wheel slip magnet valve command. (It should be noted here that if more than one form of braking force is used on the truck, more than one truck 1 wheel slip valve command unit 4D of this type would be needed.)

If the input signal F-1 from module F for Truck 1 is equal to a logical "1" or if the input signal from the zero speed determination unit 3D is equal to a logical "1", then the output signal from this one truck 1 wheel slip valve command unit 4D will be an application command to the wheel slip magnet valve of truck 1. If the input F-1 from module F is equal to a logical "0" AND if the input from 3D is equal to a logical "0", then the output signal of this truck 1 wheel slip valve command unit 4D will be determined in the following manner and sent to the wheel slip magnet valve of truck 2:

| 1D | OUTPUT |
| --- | --- |
| "REL" | Release |
| "REL_PLS" | Input F-2 From Module F Truck 1 |
| "HOLD" | Lap |
| "APP_PLS" | Apply_L 60 msec & Lap 80 msec |
| "APP" | Apply |

The final essential element of Module D is a truck 2 wheel slip valve command unit 5D. Such truck 2 wheel slip valve command unit 5D receives the following signals as inputs thereto:

TRUCK 2 PER AXLE TO PER TRUCK DETERMINATION—This input signal is the output signal from such truck 2 per axle to per truck determination unit 2D. This input signal is the highest priority force modulation command for truck 2.

TRUCK 2 VARIABLE REL_PLS—This input signal is the output signal F-3 from Module F of truck 2. This input signal will be the release time and the lap time needed to create a release pulse valve command.

ZERO SPEED DETERMINATION (ZSPD)—This input signal is the output signal D-1 from Module D. This input signal is a logical "1" when the vehicle is not moving or is moving at an almost imperceptible speed. This input signal is a logical "0" when the vehicle is moving.

Such truck 2 wheel slip valve command unit 5D is used in the process of the invention to convert the general force modulation command for truck 2 to the actual wheel slip magnet valve command. (It should be noted here that if more than one form of braking force is used on the truck, more than one truck 2 wheel slip valve command unit 5D of this type would be needed.)

If the input signal F-1 from module F for Truck 2 is equal to a logical "1" or if the input signal from such zero speed determination unit 3D is equal to a logical "1", then the output signal of such truck 2 wheel slip valve command unit 5D will be an application command to the wheel slip magnet valve of truck 2. If, however, the input signal F-1 from module F is equal to a logical "0" and if the input signal from the zero speed determination unit 3D is equal to a logical "0", then the output signal from this truck 2 wheel slip valve command unit 5D function will be determined in the following manner and sent to the wheel slip magnet valve of truck 2:

| 2D | OUTPUT |
| --- | --- |
| "REL" | Release |
| "REL_PLS" | Input F-3 From Module F Truck 2 |
| "HOLD" | Lap |
| "APP_PLS" | Apply_L 60 msec & Lap 80 msec |
| "APP" | Apply |

Figure 5A:
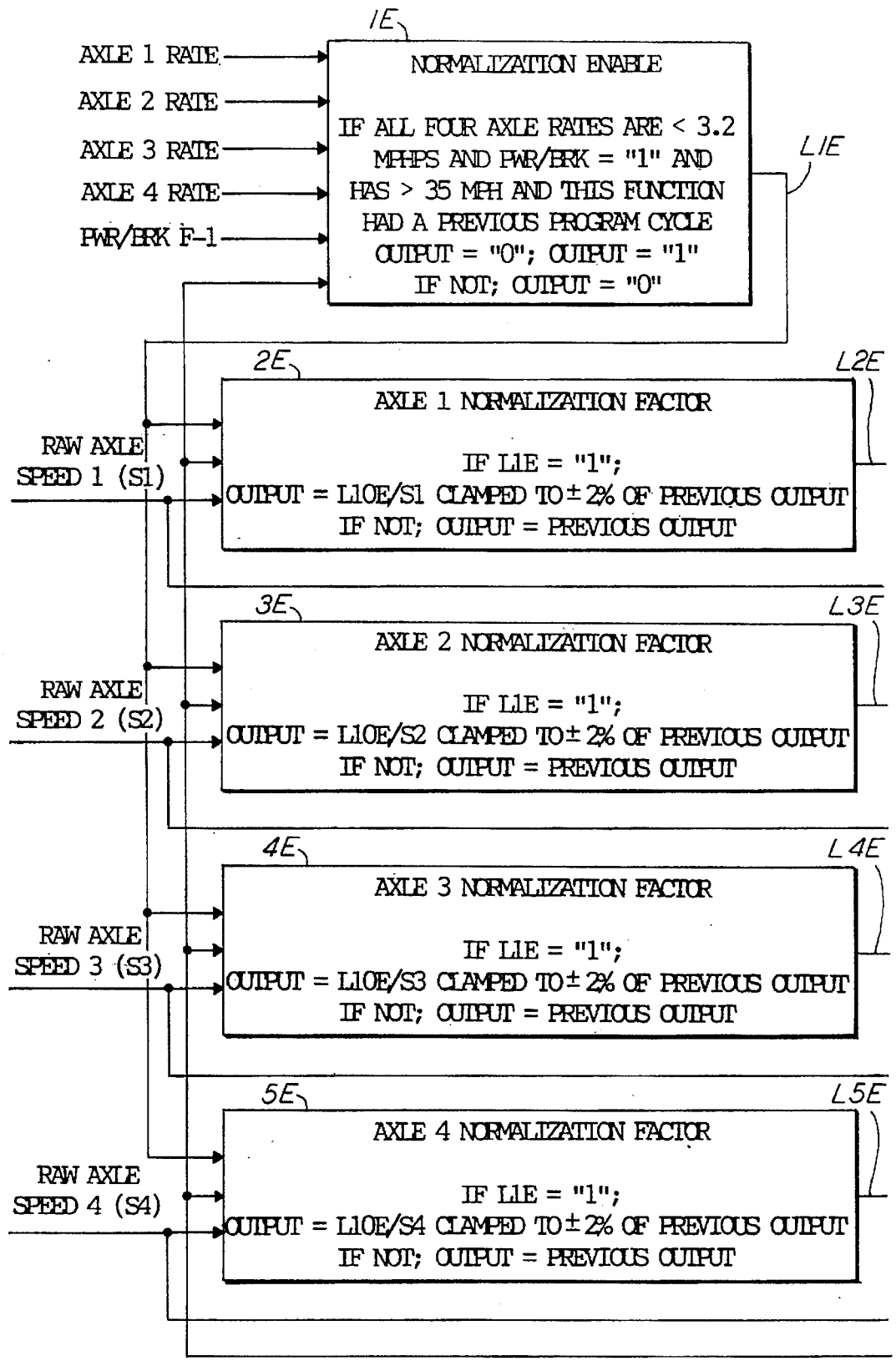
FIGS. 5A–5B are a block diagram of Module E, which is performed on a per vehicle basis, to obtain the normalized axle speeds, and the highest normalized axle speed.
Figure 5B:
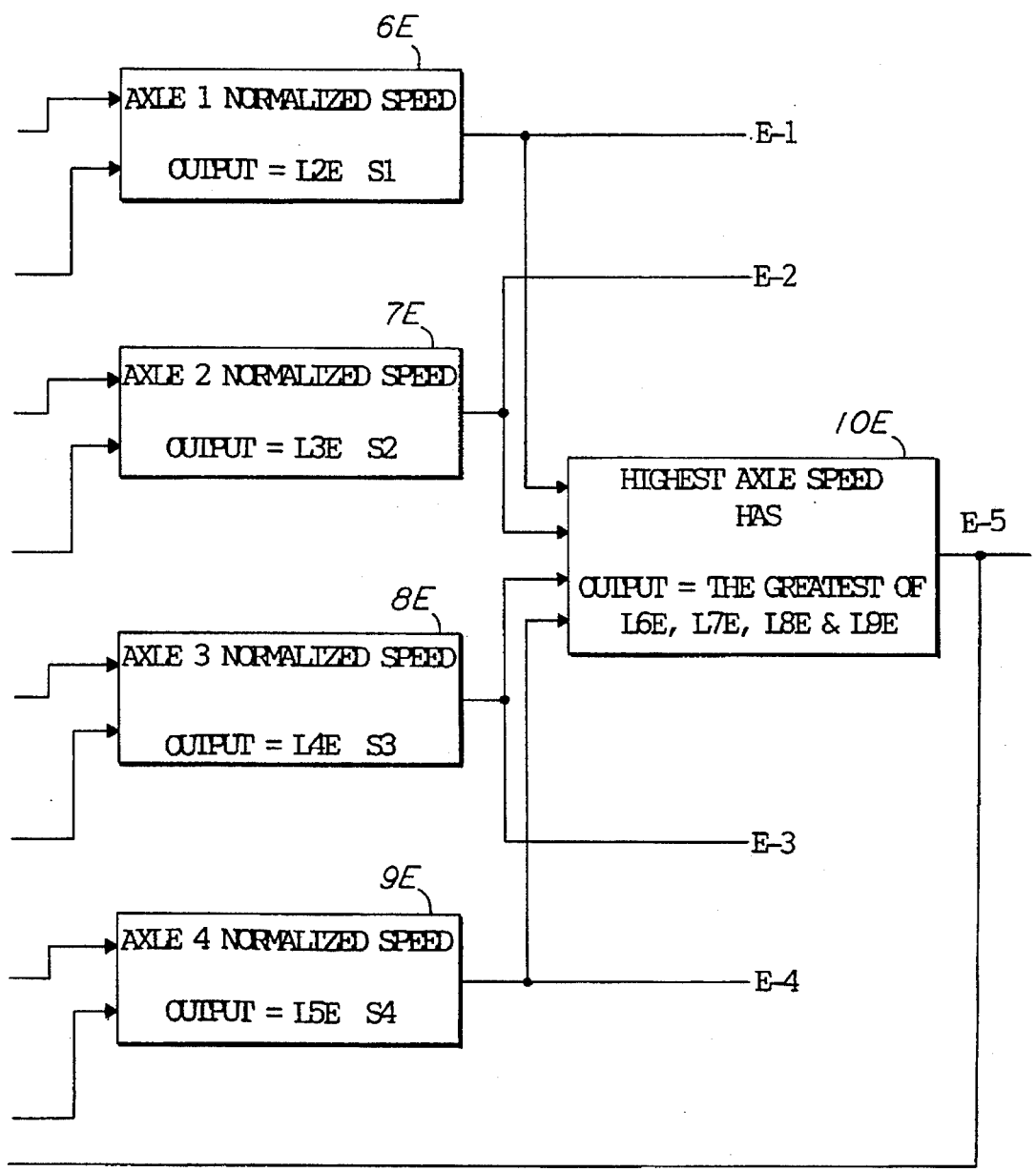

Reference is now made to FIG. 5. Illustrated therein is a presently preferred embodiment of a highest axle speed and speed normalization apparatus, hereinafter referred to as Module E. (It should be noted that the process of Module E will be performed on a per vehicle basis.)

One element of such Module E is a normalization enable unit designated in FIG. 5 as 1E. This normalization enable unit 1E receives the following signals as inputs thereto:

AXLE 1 RATE—This input signal is the acceleration/deceleration rate of the wheel/axle set which is being monitored for wheel slippage. It is developed from the differentiation of the speed signal which is externally supplied to the normalization enable unit 1E using this process by an outside source (i.e., speed pickup).

AXLE 2 RATE—This input signal is the acceleration/deceleration rate of the wheel/axle set which is being monitored for wheel slippage. It is developed from the differentiation of the speed signal which is externally supplied to such normalization enable unit 1E using this process by an outside source (i.e., speed pickup).

AXLE 3 RATE—This input signal is the acceleration/deceleration rate of the wheel/axle set which is being monitored for wheel slippage. It is developed from the differentiation of the speed signal which is externally supplied to the normalization unit iE using this process by an outside source (i.e., speed pickup).

AXLE 4 RATE—This input signal is the acceleration/deceleration rate of the wheel/axle set which is being monitored for wheel slippage. It is developed from the differentiation of the speed signal which is externally supplied to such normalization enable. unit 1E using this process by an outside source (i.e., speed pickup).

POWER/BRAKE (PWR/BRK)—This input signal is the output signal F-1 from Module F. This input signal is a logical "1"when the vehicle is not in a braking mode. This input signal, however, is a logical "0" when the vehicle is in a braking mode.

HIGHEST AXLE SPEED (HAS)—This input signal is output signal E-5 from Module E. This input signal is the highest axle speed signal of the four.

Wheel speed normalization is used to remove the relative wheel speed difference found on a vehicle's axles due to differences in wheel diameter. The normalization enable unit 1E of the present invention is used to determine the optimum time to perform the wheel speed normalization process. A time when none of the axles are slipping or spinning is the optimum time.

If the axle Rate input signal from Axle 1, Axle 2, Axle 3, and Axle 4 are all less than 3.2 MPHPS and the input signal F-1 from Module F is equal to a logical "1" and the input signal from 10E is greater than 35 MPH and this normalization enable unit 1E had an output signal of a logical "0" on the previous program cycle, then such normalization enable unit 1E will have an output signal of a logical "1". For any other conditions this normalization enable unit 1E will have an output of a logical "0".

Another component of Module E is an axle 1 normalization factor unit designated 2E. Such axle 1 normalization enable unit 2E will receive the following signals as inputs thereto:

NORMALIZATION ENABLE—This input signal is the output signal of normalization enable unit 1E. When the conditions are right to recalculate the normalization scaling factor, this input signal will be a logical "1". All other times, this input signal will be a logical "0".

HIGHEST AXLE SPEED (HAS)—This input signal is output signal E-5 from Module E. This input signal is the highest axle speed signal of the four.

RAW AXLE SPEED 1—This input signal is the speed of the wheel/axle set which is being monitored for wheel slippage. It is externally supplied to the axle 1 normalization factor unit 2E by an outside source (i.e., speed pickup).

Such axle 1 normalization factor unit 2E is used, according to the present invention, to calculate the wheel speed normalization factor for axle 1. When this factor is calculated, it is clamped so that it cannot change any more than ±2% from it's previous value. This is used to minimize the effect of an anomalous speed signal right at the moment the factor is being calculated.

If the input signal from such normalization unit 1E is equal to a logical "0", then the output signal from such axle 1 normalization unit 2E will be the previous program cycles output signal from this axle 1 normalization factor unit 2E. If, however, the input signal from the normalization enable unit 1E is equal to a logical "1", then the output signal of this axle i normalization factor unit 2E is calculated in the following manner:

The output signal from the axle 1 normalization factor unit 2E will be equal to the input signal from 10E (i.e., the highest axle speed) divided by the Raw Axle Speed of axle 1, provided that this calculation is within ±2% of this axle 1 normalization factor 2E's previous program cycle output signal. If, on the other hand, the calculation is not within ±2% of such axle 1 normalization factor 2E's previous program cycle output signal it will be limited to 102% or 98%, respectively, of the axle 1 normalization factor 2E's previous program cycle output signal.

Still another component of Module E is an axle 2 normalization factor unit designated 3E. Such axle 2 normalization enable unit 3E receives the following signals as inputs thereto:

NORMALIZATION ENABLE—This input signal is the output signal of the normalization enable unit 1E. When the conditions are right to recalculate the normalization scaling factor, this input signal will be a logical "1". At all other times, this input signal will be a logical "0".

HIGHEST AXLE SPEED (HAS)—This input signal is output signal E-5 from Module E. This input signal is the highest axle speed signal of the four.

RAW AXLE SPEED 2—This input signal is the speed of the wheel/axle set which is being monitored for wheel slippage. It is externally supplied to such axle 2 normalization unit 3E by an outside source (i.e., speed pickup).

This axle 2 normalization factor unit 3E is used in the present invention to calculate the wheel speed normalization factor for axle 2. When this factor is calculated, it is clamped so that it cannot change any more than ±2% from it's previous value. This is used to minimize the effect of an anomalous speed signal right at the moment the factor is being calculated.

According to this invention, if the input signal from such normalization unit 1E is equal to a logical "0", then the output signal of the axle 2 normalization factor unit 3E will be the previous program cycles output signal from this axle 2 normalization factor unit 3E. If, however, the input signal from the normalization enable unit 1E is equal to a logical "1", then the output signal from such axle 2 normalization factor unit 3E is calculated in the following manner:

The output signal from the axle 2 normalization factor unit 3E will be equal to the input signal from 10E (i.e., the highest axle speed) divided by the raw axle speed of axle 2, provided that this calculation is within ±2% of the axle 2 normalization factor unit 3E's previous program cycle output signal. If the calculation is not within ±2% of such axle 2 normalization factor unit 3E's previous program cycle output signal it will be limited to 102% or 98%, respectively, of the axle 2 normalization factor unit 3E's previous program cycle output signal.

Yet still another component of Module E is an axle 3 normalization factor unit designated 4E. Such axle 3 normalization enable unit 4E receives the following signals as inputs thereto:

NORMALIZATION ENABLE—This input signal is the output signal of the normalization enable unit 1E. When the conditions are right to recalculate the normalization scaling factor, this input signal will be a logical "1". Otherwise, at all other times, this signal will be a logical "0".

HIGHEST AXLE SPEED (BAS)—This input signal is the output signal E-5 from Module E. This input signal is the highest axle speed signal of the four.

RAW AXLE SPEED 3—This input signal is the speed of the wheel/axle set which is being monitored for wheel slippage. It is externally supplied to the axle 3 normalization factor unit 4E by an outside source (i.e., speed pickup).

This axle 3 normalization factor unit 4E is used in the invention to calculate the wheel speed normalization factor for axle 3. When this factor is calculated, it is clamped so that it cannot change any more than ±2% from it's previous value. This is used to minimize the effect of an anomalous speed signal right at the moment the factor is being calculated.

If the input signal from the normalization enable unit 1E is equal to a logical "0", then the output signal of such axle 3 normalization factor unit 4E will be the previous program cycle's output signal from such axle 3 normalization factor unit 4E. If, however, the input signal from such normalization enable unit 1E is equal to a logical "1", then the output signal of such axle 3 normalization factor unit 4E is calculated in the following manner:

The output signal from this axle 3 normalization factor unit 4E will be equal to the input from 10E (i.e., the highest axle speed) divided by the raw axle speed of axle 3, provided that this calculation is within ±2% of such axle 3 normalization factor unit 4E's previous program cycle output signal. If the calculation is not within ±2% of the axle 3 normalization factor unit 4E's previous program cycle output signal it will be limited to 102% or 98%, respectively, of such axle 3 normalization factor unit 4E's previous program cycle output signal.

An axle 4 normalization factor unit designated 5E is also provided in Module E. Such axle 4 normalization factor unit 5E will receive the following signals as inputs thereto:

NORMALIZATION ENABLE—This input signal is the output signal of such normalization enable unit function 1E. When the conditions are right to recalculate the normalization scaling factor, this input signal will be a logical "1". At all other times, this input signal will be a logical "0".

HIGHEST AXLE SPEED (HAS)—This input signal is the output signal E-5 from Module E. This input signal is the highest axle speed signal of the four.

RAW AXLE SPEED 4—This input signal is the speed of the wheel/axle set which is being monitored for wheel slippage. It is externally supplied to the axle 4 normalization factor unit 5E by an outside source (i.e., speed pickup).

This axle 4 normalization factor unit 5E is used in the present invention to calculate the wheel speed normalization factor for axle 4. When this factor is calculated, it is clamped so that it cannot change any more than ±2% from it's previous value. This is used in order to minimize the effect of an anomalous speed signal right at the moment the factor is being calculated.

If the input signal from the normalization enable unit 1E is equal to a logical "0", then the output signal of the axle 4 normalization factor unit 5E will be the previous program cycle's output signal from axle 4 normalization factor unit 5E. On the other hand, if the input signal from such normalization enable unit 1E is equal to a logical "1", then the output signal from the axle 4 normalization factor unit 5E is calculated in the following manner:

The output signal from axle 4 normalization factor unit 5E will be equal to the input signal from 10E (i.e., the highest axle speed) divided by the raw axle speed of axle 4, provided that this calculation is within ±2% of such axle 4 normalization factor unit 5E's previous program cycle output signal. If, however, the calculation is not within ±2% of such axle 4 normalization factor unit 5E's previous program cycle output signal it will be limited to 102% or 98%, respectively, of the axle 4 normalization factor unit 5E's previous program cycle output signal.

A further component of Module E is an axle 1 normalized speed unit designated 6E. Such axle 1 normalized speed unit 6E receives the following signals as inputs thereto:

AXLE 1 NORMALIZATION FACTOR—This input signal is the output signal of the axle 1 normalization factor unit 2E. This input signal is the scaling factor used to normalize the respective axle speed.

RAW AXLE SPEED 1—This input signal is the speed of the wheel/axle set which is being monitored for wheel slippage. It is externally supplied to the axle 1 normalized speed unit 6E by an outside source (i.e., speed pickup).

Such axle 1 normalized speed unit 6E is used in the present invention to multiply the scale factor times the raw axle speed, producing a normalized axle speed for axle 1.

The output signal of the axle 1 normalized speed unit 6E will be the multiplication of the input signal from raw axle speed 1 times the input signal from the axle 1 normalization factor unit 2E. Such axle 1 normalized speed unit 6E produces an output signal E-1 which is used by other modules in the presently preferred embodiment of the invention.

There is an axle 2 normalized speed unit designated 7E included in Module E of this invention. The axle 2 normalized speed unit 7E receives the following signals as inputs thereto:

AXLE 2 NORMALIZATION FACTOR—This input signal is the output signal of axle 2 normalization factor unit 3E. This input signal is the scaling factor used to normalize the respective axle speed.

RAW AXLE SPEED 2—This input signal is the speed of the wheel/axle set which is being monitored for wheel slippage. It is externally supplied to the axle 2 normalized speed unit 7E by an outside source (i.e., speed pickup).

This axle 2 normalized speed unit 7E is used in the invention to multiply the scale factor times the raw axle speed, producing a normalized axle speed for axle 2.

The output signal of the axle 2 normalized speed unit 7E will be the multiplication of the input signal from raw axle speed 2 times the input signal from the axle 2 normalization factor unit 3E. This axle 2 normalized speed unit 7E produces an output signal E-2 which is used by other modules.

Additionally, there is an axle 3 normalized speed unit designated 8E included in Module E of this invention. The axle 3 normalized speed unit 8E will receive the following signals as inputs thereto:

AXLE 3 NORMALIZATION FACTOR—This input signal is the output signal of the axle 3 normalization factor unit 4E. This input signal is the scaling factor used to normalize the respective axle speed.

RAW AXLE SPEED 3—This input signal is the speed of the wheel/axle set which is being monitored for wheel slippage. It is externally supplied to the axle 3 normalized speed unit 8E by an outside source (i.e., speed pickup).

This axle 3 normalized speed unit 8E is used in the present invention to multiply the scale factor times the raw axle speed, producing a normalized axle speed for axle 3.

The output signal of such axle 3 normalized speed unit 8E will be the multiplication of the input signal from raw axle speed 3 times the input signal from the axle 3 normalization factor unit 4E. Such axle 3 normalized speed unit 8E produces an output signal E-3 which is used by other modules in the apparatus.

An axle 4 normalized speed unit designated 9E is another component in Module E. Such axle 4 normalized speed unit 9E receives the following signals as inputs thereto:

AXLE 4 NORMALIZATION FACTOR—This input signal is the output signal of the axle 4 normalization factor unit 5E. This input signal is the scaling factor used, according to the invention, to normalize the respective axle speed.

RAW AXLE SPEED 4—This input signal is the speed of the wheel/axle set which is being monitored for wheel slippage. It is externally supplied to the axle 4 normalized speed unit 9E by an outside source (i.e., speed pickup).

This axle 4 normalized speed unit 9E is used to multiply the scale factor times the raw axle speed, producing a normalized axle speed for axle 4.

The output signal of this axle 4 normalized speed unit 9E will be the multiplication of the input signal from raw axle speed 4 times the input signal from the axle 4 normalization factor unit 5E. The axle 4 normalized speed unit 9E produces an output signal E-4 which is used by other modules.

Module E further includes a highest axle speed (HAS) unit designated 10E. This highest axle speed unit 10E receives the following signals as inputs thereto:

NORMALIZED AXLE SPEED 1—This input signal is the speed of wheel/axle set 1, after it has been normalized to correct for wheel size differences.

NORMALIZED AXLE SPEED 2—This input signal is the speed of wheel/axle set 2, after it has been normalized to correct for wheel size differences.

NORMALIZED AXLE SPEED 3—This input signal is the speed of wheel/axle set 3, after it has been normalized to correct for wheel size differences.

NORMALIZED AXLE SPEED 4—This input signal is the speed of wheel/axle set 4, after it has been normalized to correct for wheel size differences.

The highest axle speed unit 10E is used in the invention to compare all of the vehicle's normalized axle speeds and select the highest for an output signal.

The output signal of such highest axle speed unit 10E will the greatest of the four input signals from 6E, 7E, BE, and 9E. This highest axle speed unit 10E produces an output signal E-5 which is used by other modules.

Figure 6A:
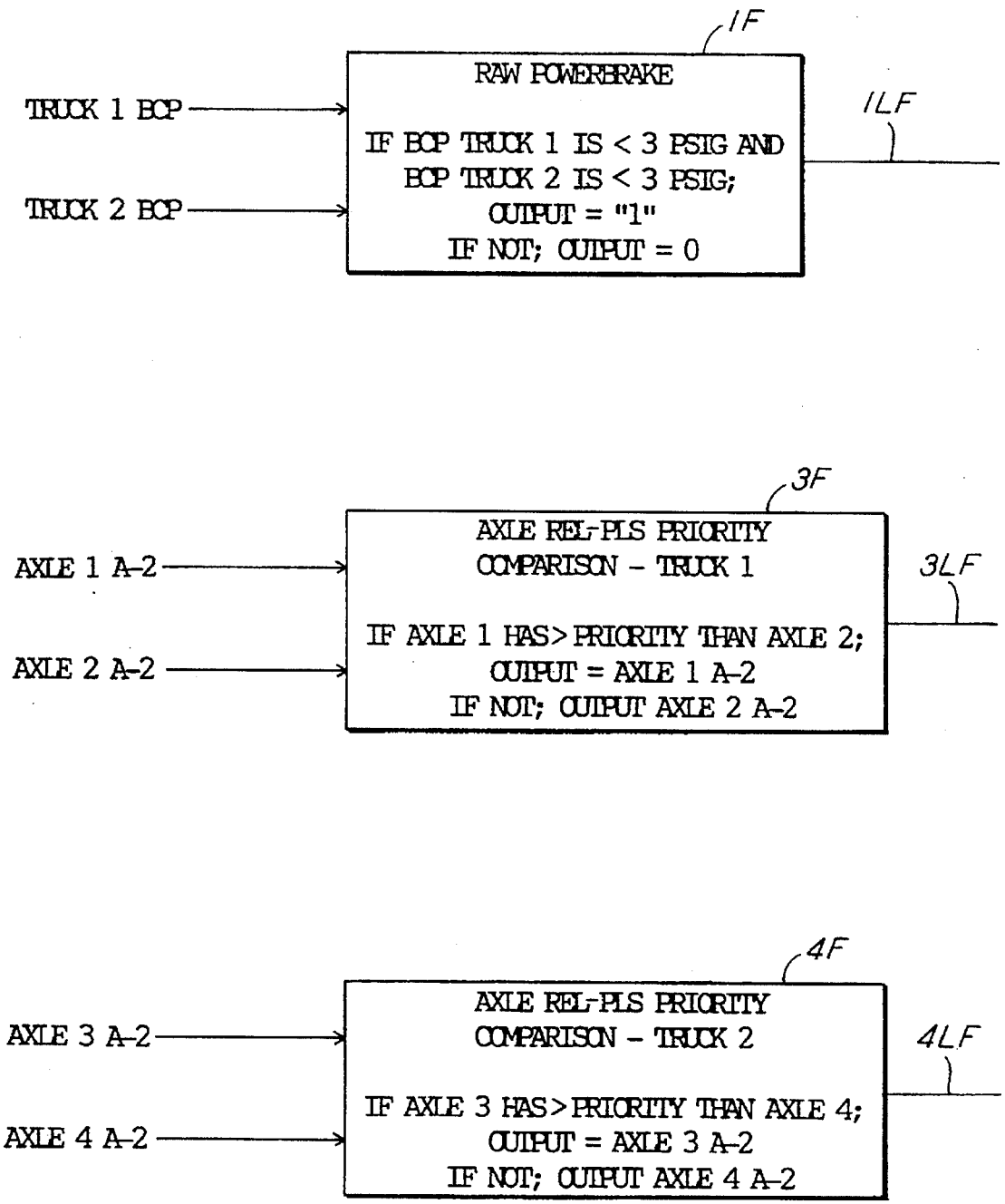
FIGS. 6A–6B are a block diagram of Module F, which is performed on a per vehicle basis and which provides a power/brake signal, and hold times and release times for pulsed brake release, for the two trucks separately.
Figure 6B:
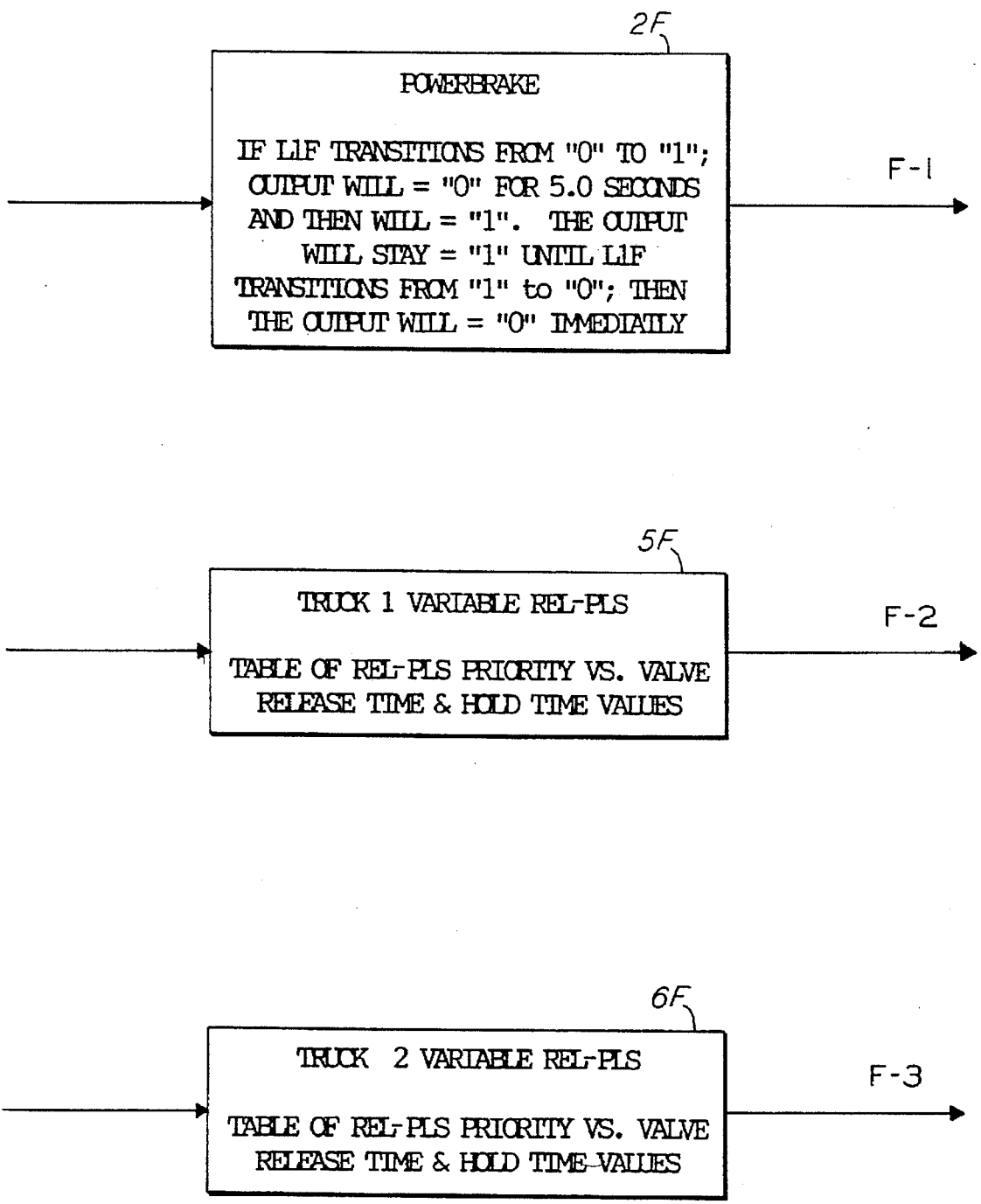

Now refer, more particularly, to FIG. 6. Illustrated therein is a presently preferred embodiment of a power/brake and release pulse determination unit, which is hereinafter referred to as Module F. (It should be noted here that the function of such Module F will be performed on a per vehicle basis.)

Such Module F includes as one component thereof a raw power/brake unit designated 1F. Raw power/brake unit 1F receives the following signals as inputs thereto:

TRUCK 1 BRAKE CYLINDER PRESSURE (BCP)—This input signal comes from an air pressure transducer which is reading the brake cylinder output of the truck 1 wheel slip magnet valve.

TRUCK 2 BRAKE CYLINDER PRESSURE (BCP)—This input signal comes from an air pressure transducer which is reading the brake cylinder output of the truck 2 wheel slip magnet valve.

The raw power/brake unit 1F is used in the present invention to determine if the vehicle is in a braking or a non-braking mode from the brake cylinder pressure transducer signal from each truck.

If the brake cylinder pressure (BCP) input signal from truck 1 is less than 3 PSIG and the brake cylinder pressure (BCP) input signal from truck 2 is less than 3 PSIG, then the output signal of such raw power/brake unit iF will be a logical "1". If, however, the brake cylinder pressure (BCP) input signal from truck 1 is greater than or equal to 3 PSIG or the brake cylinder pressure (BCP) input signal from truck 2 is greater than or equal to 3 PSIG, then the output signal of this raw power/brake unit 1F will be a logical "0".

Another component of Module F is a power/brake unit 2F. Such power/brake unit 2F receives the following signal as an input thereto:

RAW POWER/BRAKE—This input signal is the output signal of the raw power/brake unit 1F. A logical "1" indicates to the process that the vehicle is not in a brake mode. A logical "0" indicates to the process that the vehicle is in a brake mode.

If both trucks have reduced the brake cylinder pressure below the brake release pressure limit during wheel slip control, a false non-braking mode condition may occur. (Note: this is a rare condition but is logically possible.) This power/brake unit 2F is used by the invention to add a timing hysteresis to the change from a braking mode to a non-braking mode determination, to minimize the possibility of a false non-braking mode determination.

If the input signal from the raw power/brake unit 1F transitions from a logical "0" to a logical "1", then the output signal of this power/brake unit 2F will equal a logical "0" for a delay period of 5.0 seconds and then change to a logical "1". Such power/brake unit 2F's output signal will remain a logical "1" until the input signal from the raw power/brake unit iF transitions from a logical "1" to a logical "0", then the output signal of such power/brake unit 2F will immediately be set equal to a logical "0".

Additionally, Module F includes an axle release pulse priority comparison-truck 1 unit 3F which receives the following signals as inputs thereto:

AXLE 1 REL_PLS PRIORITY DETERMINATION—
This input signal is the output signal A-2 from Module A of axle 1. This input signal is the priority ranking of the respective axle for release pulse determination.

AXLE 2 REL_PLS PRIORITY DETERMINATION—
This input signal is the output signal A-2 from Module A of axle 2. This input signal is the priority ranking of the respective axle for release pulse determination.

The axle with the highest release pulse priority has the most severe slip and is in need of the most rapid brake force reduction. The axle release pulse priority comparison-truck 1 unit 3F selects the highest priority signal from truck 1 and uses it as the output signal.

If the input signal A-2 from axle 1 from Module A has a greater priority than the priority of the input signal A-2 from axle 2 from Module A, then the output signal from such axle release pulse priority comparison-truck 1 unit 3F will be equal to the input signal A-2 from axle 1 from Module A. If, on the other hand, the input signal A-2 from axle 1 from Module A has a priority less than or equal to the priority of the input signal A-2 from axle 2 from Module A, then the output signal of this axle release pulse priority comparison-truck 1 unit 3F will be equal to the input signal A-2 from axle 2 from Module A.

In addition, Module F includes an axle release pulse priority comparison-truck 2 unit 4F. Such axle release pulse priority comparison-truck 2 unit 4F will receive the following signals as inputs thereto:

AXLE 3 REL_PLS PRIORITY DETERMINATION—
This input signal is the output signal A-2 from Module A of axle 3. This input signal is the priority ranking of the respective axle for release pulse determination.

AXLE 4 REL_PLS PRIORITY DETERMINATION—
This input signal is the output signal A-2 from Module A of axle 4. This input signal is the priority ranking of the respective axle for release pulse determination.

The axle with the highest release pulse priority has the most severe slip and is in need of the most rapid brake force reduction. This axle release pulse priority comparison-truck 2 unit 4F selects the highest priority signal from truck 2 and uses it as the output signal.

If the input signal A-2 from axle 3 from Module A has a greater priority than the priority of the input signal A-2 from axle 4 from Module A, then the output signal of the axle release pulse priority comparison-truck 2 unit 4F will be equal to the input signal A-2 from axle 3 from Module A. If, however, the input signal A-2 from axle 3 from Module A has a priority less than or equal to the priority of the input signal A-2 from axle 4 from Module A, then the output signal from such axle release pulse priority comparison-truck 2 unit 4F will be equal to the input signal A-2 from axle 4 from Module A.

There is a truck 1 variable release pulse unit 5F provided in Module F. This truck 1 variable release pulse unit 5F receives the following signal as an input thereto:

AXLE REL_PLS PRIORITY COMPARISON TRUCK 1—This input signal is the output signal from the axle release pulse priority comparison-truck 1 unit 3F. This input signal is the priority signal used to determine the truck 1 release pulse valve timing.

The truck 1 variable release pulse unit 5F takes the truck 1 release pulse priority and determines the actual wheel slip magnet valve timing for release and lap. For a high priority signal the release pulse timing becomes close to full release pressure reduction. For a low priority signal the release pulse timing becomes a very gradual pressure reduction.

The output signal from the truck 1 variable release pulse unit 5F is determined by a look up table based on an input signal from such axle release pulse priority comparison-truck 1 unit 3F. The output signal of this truck 1 variable release pulse unit 5F is communicated to other modules and is called F-2.

The input versus output table for this truck 1 variable release pulse unit 5F is presented as follows:

| PRIORITY | RELEASE PULSE CONFIGURATION |
| --- | --- |
| 1 | 120 msec Release/40 msec Lap |
| 2 | 80 msec Release/40 msec Lap |
| 3 | 60 msec Release/60 msec Lap |

The final component making up Module F is a truck 2 variable release pulse unit designated 6F. This truck 2 variable release pulse unit 6F receives the following signal as an input thereto:

AXLE REL_PLS PRIORITY COMPARISON TRUCK 2—This input signal is the output signal from the axle release pulse priority comparison-truck 2 unit 4F. This input signal is the priority signal used to determine the truck 2 release pulse valve timing.

This truck 2 variable release pulse unit 6F takes the truck 2 release pulse priority and determines the actual wheel slip magnet valve timing for release and lap. For a high priority signal the release pulse timing becomes close to full release pressure reduction. For a low priority signal the release pulse timing becomes a very gradual pressure reduction.

The output signal from such truck 2 variable release pulse unit 6F is determined by a look up table based on an input signal from such axle release pulse priority comparison-truck 2 unit 4F. The output signal of this truck 2 variable release pulse unit 6F is communicated to other modules and is called F-3.

The input versus output table for such truck 2 variable release pulse unit 6F is presented as follows:

| PRIORITY | RELEASE PULSE CONFIGURATION |
| --- | --- |
| 1 | 120 msec Release/40 msec Lap |
| 2 | 80 msec Release/40 msec Lap |
| 3 | 60 msec Release/60 msee Lap |

The following communication lines are defined in FIGS. 1 through 6.

L1A is the communication line for the output signal of the rate detection band unit 1A.

L2A is the communication line for the output signal of the energy summation unit 2A.

L3A is the communication line for the output signal of the energy summation unit 3A.

L4A is the communication line for the output signal of the energy loss slip detector unit 4A.

L5A is the communication line for the output signal of the wheel slip intensity detector unit 5A.

A-2 is the communication line for the output signal of the axle release pulse priority determination unit 6A.

L7A is the communication line for the output signal of the speed constant unit 7A.

A-3 is the communication line for the output signal of the axle speed to highest axle speed comparison unit 8A.

L9A is the communication line for the output signal of the speed difference detection unit 9A.

A-1 is the communication line for the output signal of the detection unit 10A.

L1B is the communication line for the output signal of the rate polarity unit 1B.

B-1 is the communication line for the output signal of the positive polarity detection unit 2B.

L3B is the communication line for the output signal of the polarity shift detector unit 3B.

L4B is the communication line for the output signal of the post detection energy loss unit 4B.

L5B is the communication line for the output signal of timer table unit 5B.

L6B is the communication line for the output signal of the enable timer unit 6B.

B-2 is a communication line for an output signal of the wheel slip enable unit 7B.

B-3 is a communication line for another output signal of the wheel slip enable unit 7B.

L1C is the communication line for the output signal of the rate detection unit 1C.

L2C is the communication line for the output signal of the rate upper band unit 2C.

L3C is the communication line for the output signal of the rate lower band unit 3C.

L4C is the communication line for the output signal of the rate lower band constant unit 4C.

L5C is the communication line for the output signal of the apply pulse unit 5C.

L6C is the communication line for the output signal of the hold unit 6C.

L7C is the communication line for the output signal of the release pulse unit 7C.

C-1 is the communication line for the output signal of the release unit 8C.

L1D is the communication line for the output signal of the truck 1 per axle to per truck determination unit 1D.

L2D is the communication line for the output signal of the truck 2 per axle to per truck determination unit 2D.

D-1 is the communication line for the output signal of the zero speed determination (ZSPD) unit 3D.

L4D is the communication line for the output signal of the truck 1 wheel slip valve command unit 4D.

L5D is the communication line for the output signal of the truck 2 wheel slip valve command unit 5D.

L1E is the communication line for the output signal of the normalization enable unit 1E.

L2E is the communication line for the output signal of the axle 1 normalization factor unit 2E.

L3E is the communication line for the output signal of the axle 2 normalization factor unit 3E.

L4E is the communication line for the output signal of the axle 3 normalization factor unit 4E.

L5E is the communication line for the output signal of the axle 4 normalization factor unit 5E.

E-1 is the communication line for the output signal of the axle 1 normalized speed unit 6E.

E-2 is the communication line for the output signal of the axle 2 normalized speed unit 7E.

E-3 is the communication line for the output signal of the axle 3 normalized speed unit 8E.

E-4 is the communication line for the output signal of the axle 4 normalized speed unit 9E.

E-5 is the communication line for the output signal of the highest axle speed (HAS) unit 10E.

L1F is the communication line for the output signal of the raw power/brake unit 1F.

F-1 is the communication line for the output signal of the power/brake unit 2F.

L3F is the communication line for the output signal of the axle release pulse priority comparison-truck i unit 3F.

L4F is the communication line for the output signal of the axle release pulse priority comparison-truck 1 unit 4F.

F-2 is the communication line for the output signal of the truck 1 variable release pulse unit 5F.

F-3 is the communication line for the output signal of the truck 2 variable release pulse unit 6F.

If the present invention is to be implemented in a system which utilizes discrete electrical circuits to accomplish the functions indicated, these communication lines would be wires, bundles of wires, or like connectors. For example, L1A is a digital line which could be a single strand of wire. L5A carries a proportional signal which could be an analog voltage signal, or could be a plurality of wire strands carrying the proportional signal as a digital number. A-2 carries a three-valued signal which could be accomplished digitally by using two strands of wire. The signal carried by C-1 has five possible values: full brake application, pulsed brake application, hold, pulsed brake release, and full brake release. This could be accomplished digitally by using three strands of wire.

If, on the other hand, the present invention is implemented in a microprocessor, as is presently preferred, the various functional parts of which the modules are made, such as 1A, 2A, etc. would be lines of computer code in the microprocessor. For this case, the function of the communication lines such as L1A, etc., would be accomplished by one functional part of the program writing information to the memory of the microprocessor, and another functional part of the program reading the information from the memory.

The foregoing description of the invention is a very specific definition of a presently-preferred embodiment, to enable a person skilled in the art to practice the invention. It is not intended to limit the scope of the invention, which is defined by the appended claims.

The presently-preferred embodiment presented above is for a high speed locomotive hauled coach car. Since the axles are not driven by electric motors, the axle inertia is small. This is reflected in a relatively small value for the maximum value of timeout, 2.5 seconds seen in the table in 5B. For a self-propelled passenger transit vehicle having electric motors driving its axles, (and therefore a relatively high value for axle inertia), the maximum value of timeout could be much larger, for example, as large as 8 seconds.

For tuning this system for a given intended application, all of the values in any of the tables may be varied to enable the system to be tailored for the specific application.

We claim:

1. A wheel slip control system for modulating brake application forces being applied to a passenger transit type railway vehicle having a plurality of axles on which wheels are mounted, said wheel slip control system comprising:

(a) a first means disposed on said railway vehicle and connected to at least receive a set of first signals indicative of a speed for each of said axles and a set of second signals indicative of an acceleration rate for each of said axles for both processing said set of first signals and said set of second signals and for generating a set of third signals indicating, for each of said axles, when said wheels are slipping;

(b) a second means connected to receive at least said set of first signals indicative of said speed for each of said axles and said set of second signals indicative of said acceleration rate for each of said axles and said set of third signals indicating, for each of said axles, when said wheels are slipping for generating a set of fourth signals indicating an energy loss due to a wheel slip for each of said axles;

(c) a third means connected to receive at least said set of fourth signals indicating said energy loss due to said wheel slip for each of said axles for generating a set of fifth signals indicative of a wheel slip enable timeout value for each of said axles;

(d) a fourth means connected to receive at least said set of fifth signals indicative of said wheel slip enable timeout value for both generating a set of sixth signals indicative of a time of a wheel slip correction and for generating a set of seventh signals for ending a wheel slip correction when said time indicated by one of said set of sixth signals reaching said timeout value indicated by one of said set of fifth signals for each of said axles;

(e) a fifth means connected to receive at least said set of seventh signals for ending said wheel slip correction, said fifth means reapplying said brake application forces to said railway vehicle.

2. A wheel slip control system, according to claim 1, wherein said first means for processing said set of first signals indicative of said axle speeds and said set of second signals indicative of said acceleration rate and generating said set of third signals indicating said wheel slip for each axle of said railway vehicle further comprises:

(i) means for identifying a time when said railway vehicle is in motion, but when wheel slip is not occurring, and for generating a signal for normalization enable for said plurality of axles;

(ii) means connected to receive at least said signal for normalization enable and said set of first signals indicative of said axle speeds for generating a set of signals indicating normalization factors which are dependent upon relative wheel diameters based on said set of first signals indicative of said axle speeds;

(iii) means connected to receive at least said set of first signals and said set of signals indicating said normalization factors for generating a set of signals indicating normalized axle speeds;

(iv) means connected to receive at least said set of signals indicating said normalized axle speeds for generating a signal indicative of a highest normalized axle speed;

(v) means connected to receive at least said set of signals indicating said normalized axle speeds and said signal indicative of said highest normalized axle speed for generating a set of signals indicating slippage for each axle of said railway vehicle for any axle having a normalized axle speed which is less than said highest normalized axle speed.

3. A wheel slip control system, according to claim 1, further including a means for generating, for each axle, a signal which indicates that wheel slip has ceased based on a polarity shift in said acceleration rate indicated by one of said set of second signals.

4. A wheel slip control system, according to claim 3, wherein said means for determining that wheel slip has ceased uses as a criterion a shift in polarity from positive to negative of said acceleration rate indicated by one of said set of second signals.

5. A wheel slip control system, according to claim 1, wherein said means for processing said set of first signals indicative of said axle speeds and said set of second signals indicative of said acceleration rate and generating said signals indicating wheel slip further comprises:

(i) means for generating a set of signals indicative of rate polarity for each of said axles; (ii) means for generating a set of signals representing detection of a positive rate polarity based on said set of signals indicative of said rate polarity for each one of said axles; (iii) means for generating a set of signals, each representing detection of a polarity shift which indicates a change in said acceleration rate of one of said axles from positive to negative; (iv) means for using said set of signals indicative of said detection of polarity shift for generating a set of signals for termination of said wheel slip correction.

6. A wheel slip control system, according to claim 1, wherein said railway vehicle has a plurality of trucks on which said axles are mounted and wherein said wheel slip control system further comprises:

(i) means connected to receive at least said set of first signals indicative of said axle speed and said set of second signals indicative of said acceleration rate for generating a set of signals indicative of wheel slip intensity, one for each axle of said railway, vehicle;

(ii) means connected to receive and convert said set of signals indicative of wheel slip intensity for generating a said set of signals indicative of priority for each said axle of said railway vehicle;

(iii) means for comparing each one of said set of signals indicative of priority for each of said axles on a truck and applying brake force reduction dependent upon a highest one of said priorities indicated by said said set of signals indicative of priority for each of said axles on said truck.

7. A wheel slip control system for modulating brake application forces on a passenger transit type railway vehicle having a plurality of axles on which wheels are mounted, said wheel slip control system comprising:

(a) a first means disposed on said railway vehicle and connected to receive at least a set of first signals indicative of a speed for each of said axles and a set of second signals indicative of an acceleration rate for each of said axles for both identifying a time when wheel slip is not occurring and for generating a third signal for normalization enable when said wheel slip is not occurring;

(b) a second means connected to receive said set of first signals indicative of said speed for each of said axles and said third signal for said normalization enable for generating a set of fourth signals indicative of normalization factors which are dependent upon relative wheel diameter calculated from relative axle velocities for each of said axles on said railway vehicle during said time when said third signal for said normalization enable indicates that said wheel slip is not occurring;

(c) a third means connected to receive said set of first signals indicative of axle speeds and said set of fourth signals indicative of said normalization factors for generating a set of fifth signals indicative of normalized axle speeds for each of said axles;

(d) a fourth means connected to receive said set of second signals indicative of said acceleration rate and said set of fifth signals indicative of said normalized axle speeds for generating a sixth signal for brake valve control based on said set of second signals indicative of said acceleration rate and said set of fifth signals indicative of said normalized axle speed for each of said axles; and (e) a fifth means for processing said sixth signal for said brake valve control through a series of tests based on at least said set of second signals indicative of said acceleration rate and said set of fifth signals indicative of said normalized axle speed, to produce a seventh signal for brake valve control having at least five values, one for full brake application, one for generating a pulsed brake application signal, one for holding brakes, one for generating a pulsed brake release signal and one for releasing brakes; and (f) means for processing said set of second signals indicative of said acceleration rate and said set of fifth signals indicative of said normalized axle speed for each of said axles to generate a signal indicative of a priority for brake force reduction and processing said priority signal to generate a signal for a duration of the pulsed brake release signal and a signal indicative of a waiting time between the pulsed brake release signals.

8. A wheel slip control system, according to claim 7, wherein said means for producing said seventh signal for brake valve control further comprises:

(i) means for processing said set of second signals indicative of said axle acceleration rate to obtain a signal indicative of a rate of change in time of said axle acceleration rate;

(ii) means for processing said set of second signals indicative of said axle acceleration rate to obtain a signal indicative of an-acceleration rate in excess of a predetermined value;

(iii) means for processing said set of fourth signals indicative of said normalized axle speeds to obtain a signal for indicating a lower band to said axle acceleration rate;

(iv) means for processing each one of said second signals indicative of said axle acceleration rate and said signal indicating said lower band to obtain a said indicative of an acceleration rate less than said lower band; and (v) means for using said signal indicative of a rate of change in time of said axle acceleration rate, said signal indicative of an acceleration rate in excess of a predetermined value, and said signal indicative of an acceleration rate less than said lower band in said series of tests.

9. A process for modulating brake application forces to control wheel slip on a passenger transit type railway vehicle having a plurality of axles on which wheels are mounted, said process comprising the steps of:

(a) receiving a set of first signals indicative of a speed for each of said axles and a set of second signals indicative of an acceleration rate for each of said axles and processing said set of first signals and said said set of second signals and generating a set of third signals indicating, for each of said axles, when said wheels are slipping;

(b) processing at least said set of first signals indicative of said speed for each of said axles, said set of second signals indicative of said acceleration rate for each of said axles and said set of third signals indicating, for each of said axles, when said wheels are slipping, to generate a set of fourth signals indicating an energy loss due to said wheel slip for each of said axles;

(c) processing said set of fourth signals indicating said energy loss due to said wheel slip for each of said axles to generate a set of fifth signals indicative of a wheel slip enable timeout value for each of said axles;

(d) processing said set of fifth signals indicative of said wheel slip enable timeout value to generate a set of sixth signals indicative of a time of a wheel slip correction and a set of seventh signals for ending said wheel slip correction when said time indicated by one of said set of sixth signals reaching said timeout value indicated by one of said set of fifth signals, for each of said axles; and (e) processing at least said set of seventh signals for ending said wheel slip correction to reapply said brake application forces.

10. A wheel slip control process, according to claim 9, wherein said step of processing said set of first signals indicative of said axle speeds and said set of second signals indicative of said acceleration rate and generating said third signal indicating said wheel slip for each of said axles of said railway vehicle further comprises the additional steps of:

(i) identifying a time when said railway vehicle is in motion, but when said wheel slip is not occurring and generating a signal for normalization enable for said plurality of said axles;

(ii) processing said set of first signals indicative of said axle speeds to, generate a set of signals relative wheel diameters, said processing being activated by said signal for said normalization enable;

(iii) processing said set of first signals indicative of said axle speeds and said set of signals indicating said normalization factors to generate a set of signals indicating normalized axle speeds;

(iv) processing said set of signals indicating said normalized axle speeds to generate a signal indicative of a highest normalized axle speed; and (v) processing said set of signals indicating said normalized axle speeds and said signal indicative of said highest normalized axle speed to generate a signal for each of said axles of said railway vehicle, said signal indicating slippage for any axle having a normalized axle speed less than said highest normalized axle speed.

11. A wheel slip control process, according to claim 9, further including the step of generating for each of said axles a signal for indicating that said wheel slip has ceased based on a polarity shift in said acceleration rate indicated by one of said set of second signals.

12. A wheel slip control process, according to claim 11, wherein said step of determining that said wheel slip has ceased uses as a criterion a shift in polarity from positive to negative of said acceleration rate indicated by said one of said set of second signals.

13. A wheel slip control process, according to claim 9, wherein said step of processing said set of first signals indicative of said axle speeds and said set of second signals indicative of said acceleration rate and generating said third signals indicating said wheel slip further comprises the steps (i) generating a signal indicative of a rate polarity for each of said axles;
   (ii) generating a signal for representing detection of a positive rate polarity based on said signal indicative of said rate polarity for each of said axles;
   (iii) generating a signal for representing detection of a polarity shift which indicates a change in said acceleration rate from positive to negative; and
   (iv) using said signal indicative of said detection of said polarity shift to generate a signal for terminating said wheel slip correction.

14. A wheel slip control process, according to claim 9, wherein said railway vehicle has a plurality of trucks on which said axles are mounted, and wherein said wheel slip control process further comprises the steps of:

(i) processing said set of first signals indicative of said axle speed and said set of second signals indicative of said acceleration rate to generate a said set of signals indicative of wheel slip intensity for each of said axles of said railway vehicle;
   (ii) processing said said set of signals indicative of said wheel slip intensity to generate a said set of signals indicative of a priority for each of said axles of said railway vehicle; and
   (iii) comparing said said set of signals indicative of said priority for each of said axles on a truck and applying a brake force reduction which is dependent upon a highest one of the priorities for all of said axles on said truck.

15. A wheel slip control process comprising the following steps:

(a) processing at least a set of first signals indicative of a speed for each of said axles and a set of second signals indicative of an acceleration rate for each of said axles to identify a time when wheel slip is not occurring and generating a third signal for normalization enable when said wheel slip is not occurring;
   (b) processing said set of first signals indicative of said speed, and said third signal for said normalization enable to generate a set of fourth signals indicative of normalization factors which are dependent upon relative wheel diameter based on relative axle velocities for each of said axles on said railway vehicle during said time when said third signal for said normalization enable indicates that said wheel slip is not occurring;
   (c) processing said set of first signals indicative of said axle speeds and said set of fourth signal, indicative of said normalization factors to generate a set of fifth signals indicative of normalized axle speeds for each of said axles;
   (d) processing said set of second signals indicative of said acceleration rate for each of said axles and said set of fifth signals indicative of said normalized axle speeds to generate a set of sixth signals for brake valve control for each of said axles; and
   (e) processing said set of sixth signals for said brake valve control through a series of tests based on at least said set of second signal, indicative of said acceleration rate for each of said axles and said fourth signal indicative of said normalized axle speed to produce a seventh signal for brake valve control having at least five values, one for full brake application, one for generating a pulsed brake application signal, one for holding brakes, one for generating a pulsed brake release signal, and one for releasing brakes;
   (f) processing said set of second signals indicative of said acceleration rate for each of said axles and said set of fifth signals indicative of said normalized axle speed for each of said axles to generate a signal indicative of a priority for brake force reduction, a signal indicative of a duration of the pulsed brake release signal and a signal indicative of a waiting time between the pulsed brake release signals.

16. A wheel slip control process, according to claim 15, wherein said step of processing said set of sixth signals for brake valve control of an axle further comprises the steps of:

(i) processing one of said second signals indicative of said axle acceleration rate to obtain a signal indicative of a rate of change in time of acceleration;
   (ii) processing said second one signal indicative of said axle acceleration rate to obtain a signal indicative of acceleration in excess of a predetermined value;
   (iii) processing one of said set of fourth signals indicative of said normalized axle speed to obtain a signal for indicating a lower band to said axle acceleration rate;
   (iv) processing said one second signal indicative of said axle acceleration rate and said signal indicating said lower band to obtain a signal indicative of an acceleration rate less than said lower band; and
   (v) using said signal indicative of a rate of change in time of said axle acceleration rate, said signal indicative of acceleration in excess of a predetermined value, and said signal indicative of acceleration rate less than said lower band in said series of tests to produce said seventh signal.

* * * * *